(12) United States Patent
Finlayson

(10) Patent No.: US 9,049,407 B2
(45) Date of Patent: Jun. 2, 2015

(54) COLOR CORRECTION OF IMAGES

(75) Inventor: Graham D. Finlayson, Taverham (GB)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 13/531,032

(22) Filed: Jun. 22, 2012

(65) Prior Publication Data

US 2013/0342557 A1 Dec. 26, 2013

(51) Int. Cl.
*H04N 9/64* (2006.01)
*H04N 1/60* (2006.01)
*G09G 5/02* (2006.01)

(52) U.S. Cl.
CPC .. *H04N 9/64* (2013.01); *G09G 5/02* (2013.01); *H04N 1/60* (2013.01); *H04N 1/603* (2013.01); *G09G 2320/0693* (2013.01)

(58) Field of Classification Search
CPC ....... G09G 5/02; G09G 5/06; G09G 2340/06; G09G 2340/08; G09G 5/391; H04N 1/6002; H04N 1/6008; H04N 1/60; G06F 17/10; G06F 17/16
See application file for complete search history.

(56) References Cited

U.S. PATENT DOCUMENTS

| | | | |
|---|---|---|---|
| 5,377,025 A | 12/1994 | Spaulding et al. | |
| 5,710,644 A | 1/1998 | Ohta | |
| 7,456,845 B2 | 11/2008 | Wilt et al. | |
| 8,116,562 B2 | 2/2012 | Bezryadin | |
| 2005/0248782 A1* | 11/2005 | Tin | 358/1.9 |

OTHER PUBLICATIONS

Finlayson et al., "Root-Polynomial Colour Correction", Nineteenth Color and Imaging Conference, 13th International Symposium on Multispectral Color Science, Society for Imaging Science and Technology and Society for Information Display, San Jose, California, Nov. 7-11, 2011, 5 pages.
Martinez-Verdu et al., "Calculation of the Color Matching Functions of Digital Cameras from Their Complete Spectral Sensitivities", Journal of Imaging Science and Technology, vol. 46, No. 1, pp. 15-25, Jan./Feb. 2002.
Brady et al., "Camera calibration for natural imae studies and vision research", J. Opt. Soc. Am. A, vol. 26, No. 1, pp. 30-42, Jan. 2009.
Hung et al., "Colorimetric calibration in electronic imaging devices using a look-up-table model and interpolations", Journal of Electronic Imaging, vol. 2, No. 1, pp. 53-61, Jan. 1993.
Hong et al., "A Study of Digital Camera Colorimetric Characterization Based on Polynomial Modeling", Color research and application, Colour & Imaging Institute, University of Derby, United Kingdom, vol. 26, No. 1, pp. 76-84, 2001.

(Continued)

*Primary Examiner* — Antonio A Caschera
(74) *Attorney, Agent, or Firm* — Wong, Cabello, Lutsch, Rutherford & Brucculeri, LLP

(57) ABSTRACT

Systems and techniques can be used to correct color of an image by expanding red, green, blue (RGB) values at each pixel of the image using a base of order-root functions f(R, G,B). In one aspect, a method includes receiving an image, where a plurality of pixels of the received image have input RGB values that depend on a sensor used to acquire the image; expanding, by an image processor, the input RGB values of the plurality of pixels using a nonlinear base, such that each term of the nonlinear base scales linearly with exposure or brightness of the image; and adjusting, by the image processor, the image by transforming the expanded input RGB values of the image to output RGB values that are independent of the sensor used to acquire the image and scale linearly with the exposure or illumination of the image.

40 Claims, 9 Drawing Sheets

(56) References Cited

OTHER PUBLICATIONS

Kang, "Color Scanner Calibration", Journal of Imaging Science and Technology, vol. 36, No. 2, pp. 162-170, Mar./Apr. 1992.

Cheung et al., "Color Camera Characterisation Using Artificial Neural Networks", IS&T/SID Tenth Color Imaging Conference, Colour & Imaging Institute, University of Derby, United Kingdom, vol. 4, pp. 117-120, 2002.

Kang et al., "Neural network applications to the color scanner and printer calibrations", Journal of Electronic Imaging, vol. 1, No. 2, pp. 125-135, Apr. 1992.

Xinwu, "A New color correction Model for based on BP Neural Network", Advances in Information Sciences and Service Sciences, vol. 3, No. 5, pp. 72-78, Jun. 2011.

Clarke et al., "Modification to the JPC79 Colour-difference Formula", J. Soc. Dyers Colour, vol. 100, pp. 128-132, Apr. 1984.

Marimont et al., "Linear models of surface and illuminant spectra", J. Opt. Soc. Am. A, vol. 9, No. 11, pp. 1905-1913, Nov. 1992.

Barnard et al., "A Data Set for Color Research", Color Research and Application, vol. 27, No. 3, pp. 147-151, Jun. 2002.

\* cited by examiner

Representation of input color is:

$$234 \quad \rho_{3\times1} = [R, G, B]^T$$

Expansion of input color using base functions $f_p(R,G,B)$ is:

$$245 \quad \rho_{n\times1} = \left[ n\ terms : f_p(R, G, B) \right]^T$$

where p = 1, ..., n > 3, and the base functions $f_p(R,G,B)$ are:

$$f_p(R, G, B) = \left( R^i G^j B^l \right)^{\frac{1}{i+j+l}}$$

where exponents $i, j, l$ are rational numbers, and order of function $f_p$ is $m = i + j + l$.

Color transformation is:

$$225 \quad q_{3\times1} = M_{3\times n} \cdot \rho_{n\times1}$$

Representation of output color is:

$$266 \quad q_{3\times1} = [r, g, b]^T$$

FIG. 2A

When input color is expanded using square-root base functions (m = 2):

$$\overset{245\ (m=2)}{\curvearrowright} \rho_{6\times 1} = \left[ R, G, B, \sqrt{RG}, \sqrt{GB}, \sqrt{BG} \right]^T$$

the square-root color transformation is:

$$\underset{266\ (m=2)}{\curvearrowright} q_{3\times 1} = M_{3\times 6} \cdot \rho_{6\times 1}$$
$$\underset{225\ (m=2)}{\curvearrowright}$$

COLOR CORRECTION OF IMAGES

TECHNICAL FIELD

This specification relates generally to performing color correction of images.

BACKGROUND

A camera can record red, green and blue (RGB) responses/values, which depend on a sensor of the camera. In this manner, different cameras can produce different RGB responses for the same scene. Moreover, the RGB responses do not correspond to device-independent tristimulus values as defined by the Commission Internationale de l'Eclairage (CIE—the International Commission on Illumination), e.g., XYZ, standard RGB (sRGB), YCrCb, or the like. Further, the RGB responses for a given camera may be biased by an illuminant color, e.g., yellow light, blue light, white light, or the like. However, RGB values of an image can be mapped to target color values using a 3×3 color-transform. The target color values can be XYZs, sRGBs, etc., or camera RGBs for a specified illumination color (e.g., white light). Such mapping that uses the 3×3 color-transform is independent of camera exposure and brightness of the scene. This mapping, however, may provide inaccurate color correction over some portions of the RGB color-space where a 3×3 color-transform works less well.

An alternative mapping for color correction uses an n-term polynomial expansion of the RGB values (with n>3) and a corresponding 3×n color-transform. Here, the RGB values at each pixel of an image are expanded by n polynomial terms. For example, an RGB polynomial up to second order is represented as a 9-vector (R, G, B, $R^2$, $G^2$, $B^2$, RG, RB, GB). With respect to this polynomial expansion, color correction of an image is a 9×3 color-transform that maps the expanded RGB values represented by the 9-vector to a 3-vector of XYZ values, for instance. For a given calibration set-up, a 3×9 color-transform corresponding to the $2^{nd}$ order polynomial expansion can reduce colorimetric error by more than 50% relative to the 3×3 linear transform. However, unlike the 3×3 color-transform, a 3×n color-transform based on the polynomial expansion depends on exposure/brightness. For example, exposure/brightness changes of the RGB responses cause nonlinear changes of the polynomial expansion terms.

SUMMARY

Systems and techniques described in this specification can be used to correct color of an image by expanding RGB values, at each pixel of the image, using a base of order-root functions f(R,G,B). An example of a base of order-root functions f(R,G,B) that can be used to perform the disclosed color correction is a root polynomial RGB expansion. Terms of the root polynomial RGB expansion correspond to an m-root of m-order terms of a polynomial RGB expansion. For example, R, G, B, $(RG)^{1/2}$, $(RB)^{1/2}$ and $(GB)^{1/2}$ are independent root terms for a $2^{nd}$ order polynomial RGB expansion. Note that there are 6 independent terms for the square root polynomial RGB expansion instead of the 9 terms of the $2^{nd}$ order polynomial RGB expansion, because the first roots of R, G and B equal the square roots of $R^2$, $G^2$ and $B^2$. However, unlike some terms of a polynomial RGB expansion which scale nonlinearly with light intensity of an image (due to camera exposure or scene brightness or both), all terms of the root polynomial RGB expansion scale with the light intensity. As such, a 6×3 color-transform based on the square-root polynomial RGB expansion can be used to map RGB values to XYZ values, for instance. Experimental results described in this specification show that color corrections based on order-root base functions enhance color correction performance on real and synthetic data. Also described in this specification are additional examples of order-root base functions f(R,G,B) used to expand color values in an input color-space and corresponding color-transforms used to map the expanded color values from the input color-space to a target color-space.

In general, one aspect of the subject matter described in this specification can be implemented in methods that include receiving an image, where a plurality of pixels of the received image have input red, green and blue (RGB) values that depend on a sensor used to acquire the image; expanding, by an image processor, the input RGB values of the plurality of pixels using a nonlinear base, such that each term of the nonlinear base scales linearly with exposure or brightness of the image; and adjusting, by the image processor, the image by transforming the expanded input RGB values of the image to output RGB values that are independent of the sensor used to acquire the image and scale linearly with the exposure or illumination of the image.

Other implementations of this aspect include corresponding computer systems, apparatus, and computer programs recorded on one or more computer storage devices, each configured to perform the methods. A system of one or more computers can be so configured by virtue of software, firmware, hardware, or a combination of them installed on the system that in operation cause the system to perform the methods. One or more computer programs can be so configured by virtue of having instructions that, when executed by data processing apparatus, cause the apparatus to perform the methods.

The foregoing and other implementations can each optionally include one or more of the following features, alone or in combination. In some implementations, the nonlinear base can be an order-root RGB polynomial. For example, the order-root RGB polynomial can be a square-root polynomial, and the terms of the square-root polynomial are {R, G, B, $(RG)^{1/2}$, $(GB)^{1/2}$, $(BR)^{1/2}$}. As another example, the order-root RGB polynomial can be a cube-root polynomial, and the terms of the cube-root polynomial are {R, G, B, $(RG)^{1/2}$, $(GB)^{1/2}$, $(BR)^{1/2}$, $(R^2G)^{1/3}$, $(R^2B)^{1/3}$, $(G^2B)^{1/3}$, $(G^2R)^{1/3}$, $(B^2G)^{1/3}$, $(B^2R)^{1/3}$, $(RGB)^{1/3}$}. As yet another example, the order-root RGB polynomial can be a fourth-root polynomial, and the terms of the fourth-root polynomial are {R, G, B, $(RG)^{1/2}$, $(GB)^{1/2}$, $(BR)^{1/2}$, $(R^2G)^{1/3}$, $(R^2B)^{1/3}$, $(G^2B)^{1/3}$, $(G^2R)^{1/3}$, $(B^2G)^{1/3}$, $(B^2R)^{1/3}$, $(RGB)^{1/3}$, $(R^3G)^{1/4}$, $(R^3B)^{1/4}$, $(G^3B)^{1/4}$, $(G^3R)^{1/4}$, $(B^3G)^{1/4}$, $(B^3R)^{1/4}$, $(R^2G^2)^{1/4}$, $(R^2B^2)^{1/4}$, $(G^2B^2)^{1/4}$, $(R^2GB)^{1/4}$, $(G^2RB)^{1/4}$, $(B^2RG)^{1/4}$}.

In some implementations, the terms of the nonlinear base can correspond to functions f(R,G,B), where each of the functions f(R,G,B) includes an associated product of RGB powers that is raised to an inverse-order of the associated product, such that an order of a product of RGB powers equals a sum of rational exponents of R, G and B factors of the product of RGB powers. In some implementations, the terms of the nonlinear base can correspond to functions f(R,G,B), where each of the functions f(R,G,B) has an associated value and f(kR,kG,kB) equals k times the associated value, for any scalar k>0.

In some implementations, the output RGB values can correspond to tristimulus XYZ values. In some implementations, the output RGB values can correspond to standard RGB (sRGB) values. In some implementations, the output RGB values can correspond to RGB values for a specified illumination color. In some implementations, the methods can further include displaying the adjusted image on a display device. In some implementations, the methods can further include sending the adjusted image to a printer device.

In general, another aspect of the subject matter described in this specification can be implemented in methods that include obtaining a training set of images comprising input red, green and blue (RGB) values that depend on sensors used to acquire the images of the training set, and corresponding output RGB values that are independent of the sensors used to acquire the images of the training set; expanding, by a processor, the input RGB values of the training set of images using a nonlinear base, such that each term of the nonlinear base scales linearly with exposure or brightness of the images of the training set; and generating, by the processor, a color-transform from the expanded input RGB values and the corresponding output RGB values.

Other implementations of this aspect include corresponding computer systems, apparatus, and computer programs recorded on one or more computer storage devices, each configured to perform the methods. The foregoing and other implementations can each optionally include one or more of the following features, alone or in combination. In some implementations, generating the color-transform can be performed by regression. For example, the regression can be based on trimmed median of squares. In some implementations, the methods can include storing, on persistent storage, the generated color-transform, such that an image acquisition device can transform expanded input RGB values of an image acquired by the image acquisition device to the output RGB values of the acquired image by using the stored color-transform.

In some implementations, the output RGB values can correspond to tristimulus XYZ, standard RGB (sRGB), or YCbCr values. In some implementations, the terms of the nonlinear base can correspond to functions f(R,G,B), where each of the functions f(R,G,B) includes an associated product of RGB powers that is raised to an inverse-order of the associated product, such that an order of a product of RGB powers equals a sum of rational exponents of R, G and B factors of the product of RGB powers. In some implementations, the terms of the nonlinear base can correspond to functions f(R,G,B), where each of the functions f(R,G,B) has an associated value and f(kR,kG,kB) equals k times the associated value, for any scalar k>0. In some implementations, the nonlinear base can include an order-root RGB polynomial.

In general, another aspect of the subject matter described in this specification can be implemented in methods that include obtaining a training set of images comprising input red, blue and green (RGB) values that depend on sensors used to acquire the images of the training set and corresponding output RGB values that are independent of the sensors used to acquire the images of the training set; forming, by a processor, color-bias groups from the training set of images, where each image in a color-bias group from among the formed color-bias groups has a color-bias corresponding to a color-bias associated with the color-bias group; for each color-bias group from among the formed color-bias groups, expanding, by a processor, the input RGB values of the color-bias group using a nonlinear base, such that each term of the nonlinear base scales linearly with exposure or brightness of the images of the training set; and generating, by a processor, a color-transform corresponding to a color-bias associated with the color-bias group from the expanded input RGB values and the corresponding output RGB values of the color-bias group.

Other implementations of this aspect include corresponding computer systems, apparatus, and computer programs recorded on one or more computer storage devices, each configured to perform the methods. The foregoing and other implementations can each optionally include one or more of the following features, alone or in combination. In some implementations, generating the color-transform can be performed by regression. For example, the regression can be based on trimmed median of squares. In some implementations, the methods can include storing, on persistent storage, the generated color-transforms corresponding to the color-bias groups, such that an image acquisition device can transform expanded input RGB values of an image acquired by the image acquisition device to the output RGB values of the acquired image by using one of the stored color-transforms that corresponds to a color-bias of the acquired image. In some implementations, the output RGB values can correspond to tristimulus XYZ, standard RGB (sRGB), or YCbCr values. In some implementations, the terms of the nonlinear base can correspond to functions f(R,G,B), where each of the functions f(R,G,B) comprises an associated product of RGB powers that is raised to an inverse-order of the associated product, such that an order of a product of RGB powers equals a sum of rational exponents of R, G and B factors of the product of RGB powers. In some implementations, the terms of the nonlinear base can correspond to functions f(R,G,B), where each of the functions f(R,G,B) has an associated value and f(kR,kG,kB) equals k times the associated value, for any scalar k>0. In some implementations, the nonlinear base can include an order-root RGB polynomial.

In general, another aspect of the subject matter described in this specification can be implemented in systems that include one or more hardware processors, and a storage device storing instructions that when executed by the one or more hardware processors cause the system to execute operations including receiving an image including color values in an input color-space; expanding the color values of the image in the input color-space using a nonlinear base, such that each term of the nonlinear base scales linearly with exposure/brightness of the received image; retrieving, from the storage device, a color-transform corresponding to the nonlinear base; transforming the expanded color values of the image in the input color-space using the retrieved color-transform to obtain color values of the image in a target color-space; and outputting a color-corrected instance of the image that includes the color values of the image in the target color-space.

The foregoing and other implementations can each optionally include one or more of the following features, alone or in combination. In some implementations, the system can include a sensor used to acquire the image. The input color-space can be a red, green and blue (RGB) space for which the RGB values depend on the sensor used to acquire the image. For example, the target color-space can be a tristimulus XYZ space for which the XYZ values are independent of the sensor used to acquire the image and scale linearly with the exposure or illumination of the image. As another example, the target color-space can be a standard red, green and blue (sRGB) space for which the sRGB values are independent of the sensor used to acquire the image and scale linearly with the exposure or illumination of the received image. As yet another example, the target color-space can corresponds to red, green and blue (RGB) values for a specified illumination color. The operation of receiving the image can include retrieving, from the storage device, another color-transform, and transforming the RGB values of the image that is acquired by the sensor to the color values in the input color-space. Also, the color values of the image in each of the input or output color-space can be independent of the sensor used to acquire the image and scale linearly with the exposure or illumination of the image. Further, the input color-space can be one of a standard RGB (sRGB) space, a tristimulus XYZ space or a YCbCr space. Furthermore, the target color-space can be one of the sRGB space, the tristimulus XYZ space or the YCbCr space. Moreover, the input color-space can be different from the target color-space.

In some implementations, the terms of the nonlinear base can correspond to functions f(R,G,B), where each of the functions f(R,G,B) includes an associated product of RGB powers that is raised to an inverse-order of the associated product, such that an order of a product of RGB powers equals a sum of rational exponents of R, G and B factors of the product of RGB powers. In some implementations, the terms of the nonlinear base can correspond to functions f(R,G,B), where each of the functions f(R,G,B) has an associated value and f(kR,kG,kB) equals k times the associated value, for any scalar k>0. In some implementations, the nonlinear base can include an order-root RGB polynomial. For example, the order-root RGB polynomial can be a square-root polynomial, and the terms of the square-root polynomial are $\{R, G, B, (RG)^{1/2}, (GB)^{1/2}, (BR)^{1/2}\}$. As another example, the order-root RGB polynomial can be a cube-root polynomial, and the terms of the cube-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}\}$. As yet another example, the order-root RGB polynomial can be a fourth-root polynomial, and the terms of the fourth-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}, (R^3G)^{1/4}, (R^3G)^{1/4}, (G^3G)^{1/4}, (G^3R)^{1/4}, (B^3G)^{1/4}, (B^3R)^{1/4}, (R^2G^2)^{1/4}, (R^2B^2)^{1/4}, (G^2B^2)^{1/4}, (R^2GB)^{1/4}, (G^2RB)^{1/4}, (B^2RG)^{1/4}\}$.

In some implementations, the operations can further include obtaining a training set of images comprising color values in the input color-space and corresponding color values in the target color-space; expanding the color values of the training set of images in the input color-space using the nonlinear base; generating a color-transform from the expanded color values in the input color-space and the corresponding color values in the target color-space; and storing the generated color-transform on the storage device. For example, the operation of generating the color-transform can performed by regression. The regression can based on trimmed median of squares, for instance.

In some implementations, the operations can further include retrieving multiple training sets of images, each of the training sets having an associated color-bias and including color values in the input color-space and corresponding output color values in the target color-space; for each training set from among the multiple training sets, expanding the color values of the training set in the input color-space using the nonlinear base, generating a color-transform corresponding to a color-bias associated with the training set from the expanded color values of the training set in the input color-space and the corresponding color values of the training set in the target color-space, and storing the generated color-transform corresponding to the color-bias on the storage device; prior to performing the operation of retrieving, from the storage device, the color-transform corresponding to the nonlinear base, obtaining a color-bias of the received image, and selecting, from among the multiple color-transforms stored on the storage device, a color-transform corresponding to the nonlinear base and the obtained color-bias; and the retrieved color-transform used to perform the operation of transforming is the selected color-transform. For example, the operation of obtaining the color-bias of the received image can include determining the color-bias of the received image. As another example, the color-bias of the received image can be obtained from metadata associated with the received image.

In some implementations, outputting the color-corrected image can include sending the color-corrected image to a printer that is communicatively coupled with the system. In some implementations, the system can include a display device, where the color-corrected image can be output on the display device.

Particular implementations of the subject matter described in this specification can be configured so as to realize one or more of the following potential advantages. Root polynomial-based color correction builds on polynomial-based color correction, but unlike the latter, the former is invariant to the change of camera exposure and/or scene irradiance. The results presented in this specification show that root polynomial-based color correction outperforms linear-based color correction and offers improvements over polynomial-based color correction when the exposure/scene irradiance varies.

Details of one or more implementations of the described subject matter are set forth in the accompanying drawings and the description below. Other features, aspects, and potential advantages will become apparent from the description, the drawings, and the claims.

BRIEF DESCRIPTION OF THE DRAWINGS

FIGS. 2A-2B show examples of color-transforms implemented to correct color of the digital images.

FIGS. 3B-3D show experimental results obtained by applying alternative color correction techniques.

Like reference numbers and designations in the various drawings indicate like elements.

DETAILED DESCRIPTION

Figure 1:
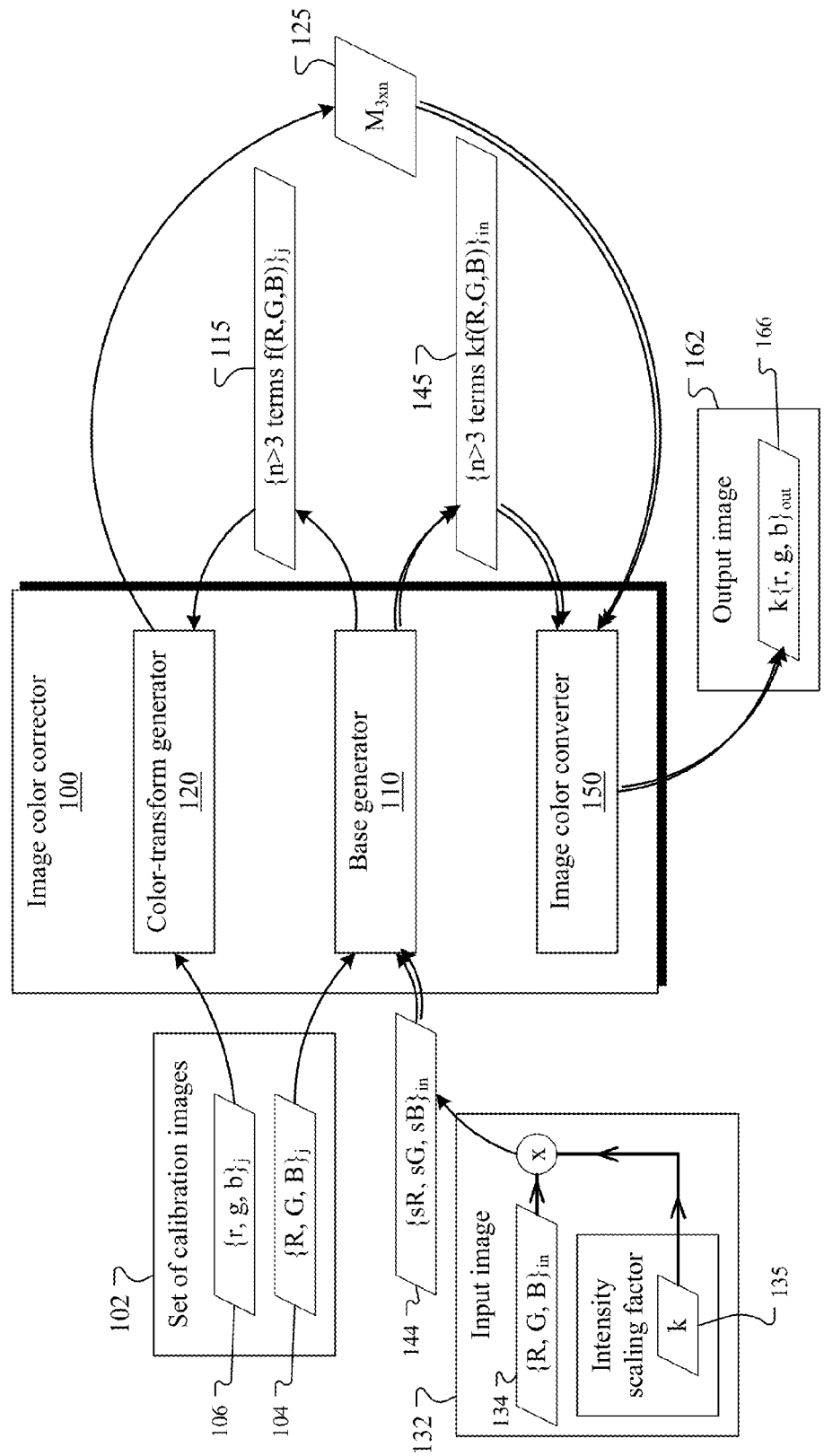
FIG. 1 shows an example of a system used to map color values of a digital image from an input color-space to an output color-space.

FIG. 1 shows an example of an image corrector system 100 used to map color values of a digital image from an input color-space to an output color-space. The color values in the output color-space (also referred to as a target color-space) for an image processed with the image corrector system 100 are independent of the sensor used to acquire the image. Examples of output (or target) color-spaces are standard RGB (sRGB), XYZ or YCbCr. In this specification, the color values in the output color-space are represented using lower case. For example, sRGB values in the output space are represented as $\{r, g, b\}$, and XYZ color values in the output space are represented as $\{x, y, z\}$. The color values in the input color-space for an image to be processed with the image corrector system 100 can but not necessarily have to depend on a sensor used to acquire the image. An example of the former input color-space is an RGB color-space. Examples of the latter input color-spaces are sRGB, XYZ or YCbCr. In this specification, the color values in the input color-space are represented using upper case. For example, RGB values in the input color-space are represented as {R, G, B}, and XYZ values in the input color-space are represented as {X, Y, Z}.

Figure 7:
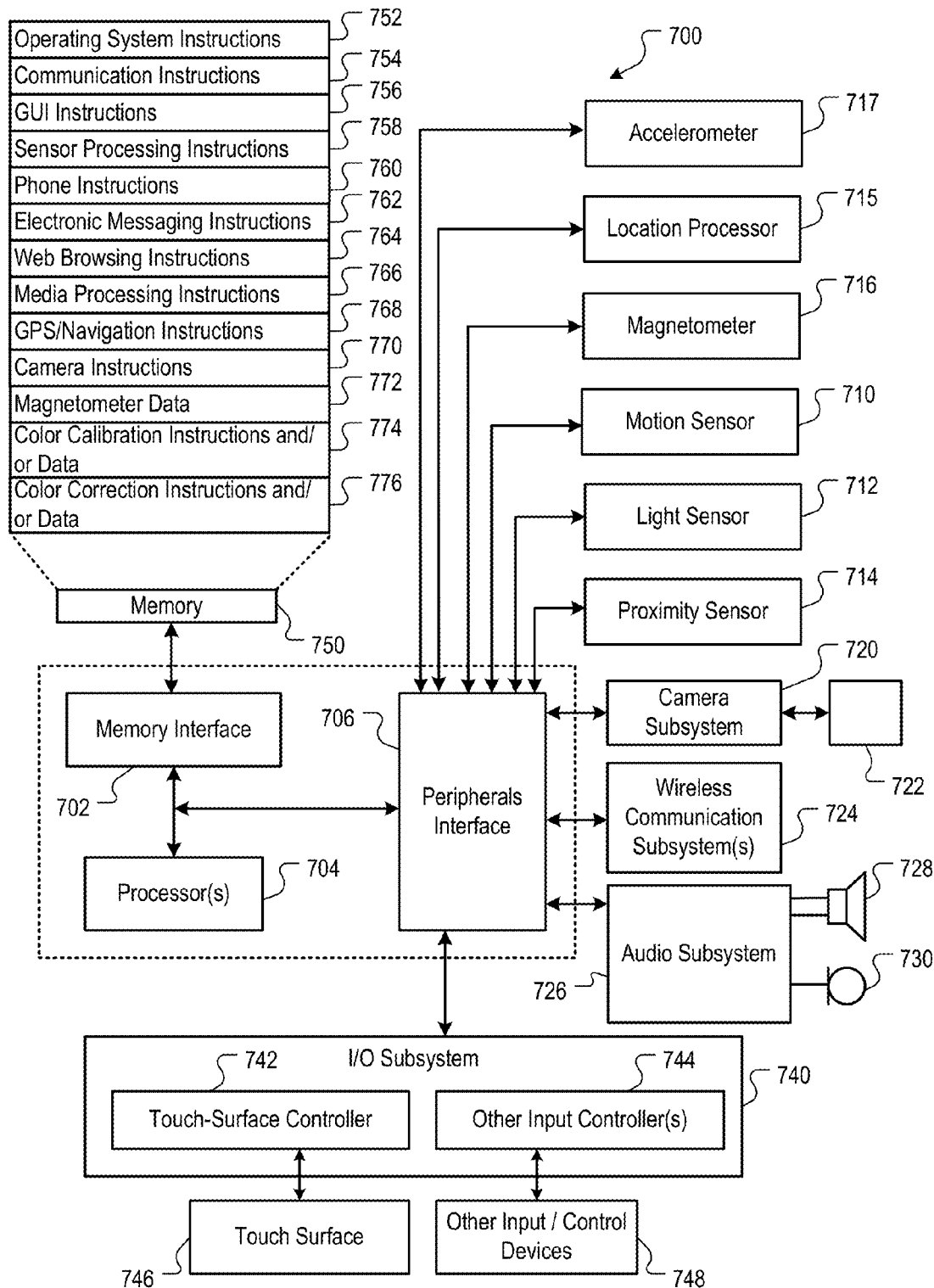
FIG. 7 is a block diagram of an example of a computer system operated according to the technologies described above in connection with FIGS. 1-6.

In some implementations, the image corrector system 100 can be implemented as part of an image processing application executed by a computer system. In other implementations, the system 100 can be implemented as a portion of electronic circuitry of the computer system, e.g., an ASIC, a graphical processing unit, and the like, configured to perform functions of the image corrector system 100. The computer system can be a cellular telephone, a smartphone, a personal digital assistant (PDA), a mobile computer, e.g., a tablet computer, a laptop, a digital camera, a media player or a combination of these. An example of a computer system 700 is shown in FIG. 7. The computer system 700 can include a display device 740 that can display an output digital image including color values in the output (display) color-space.

The image corrector system 100 includes a plurality of utilities that carry out color processing of an input digital image to correct color values in an input color-space to obtain an output image that has corrected color values in an output color-space. In some implementations, the plurality of utilities of the system 100 can include a base generator utility 110, a color-transform generator utility 120 and an image converter utility 150. These implementations corresponding to a dual-mode of the image corrector system 100 can be used (i) to generate a color-transform 125 that maps input color values 104 of a training set 102 of digital images in an input color-space to output color values 106 of the training set 102 of digital images in an output color-space, and (ii) to correct, with the generated color-transform 125, color values 144 of an input image 132 in the input color-space to obtain an output image 162 that has output color values 166 in the output color-space. A quantity of digital images in the training set 102 can be 40-60, for instance.

In other implementations, the plurality of utilities of the image corrector system 100 can include the base generator utility 110 and the color-transform generator utility 120. These implementations corresponding to a training-mode of the image corrector system 100 can be used to generate the color-transform 125 that maps input color values 104 of the training set 102 of digital images in the input color-space to output color values 106 of the training set 102 of digital images in the output color-space. The color-transform 125 can be generated using digital images from the training set 102, regardless of the color-bias of these digital images. Alternatively or additionally, as described in detail in connection with FIG. 4, multiple color-transforms corresponding to respective color-biases can be generated by the image corrector system 100, such that each of the color-transforms is generated to correct images that have a color-bias associated with the respective color-transform. The generated color-transform(s) 125 can be stored for later use by the image color convertor 150 of the image corrector system 100 or by another image color corrector system.

In some other implementations, the plurality of utilities of the image corrector system 100 can include the base generator utility 110 and an image converter utility 150. These implementations corresponding to a correction-mode of the image corrector system 100 can be used to correct the color values 144 of the input image 132 in the input color-space to obtain the output image 162 that has output color values 166 in the output color-space. The correction can be applied with the color-transform 125 that was previously generated by the color-transform generator utility 120 of the image corrector system 100 or of another image color corrector system. An example of a correction-mode implementation of the image corrector system 100 is described in connection with FIG. 4.

When operated in training mode, the image color corrector system 100 can access a set of calibration images 102 (also referred to as a set of training images 102) having known color values in an input color-space 104 and known color values in an output color-space. For example, there can be 40-60 images in the set of calibration images 102. In the example illustrated in FIG. 1, the input color-space is RGB (in which RGB values depend on a sensor used to acquire the calibration images) and the output color-space is sRGB (in which sRGB values are independent from the sensor used to acquire the calibration images). In general, an image can have N pixels, and each of the N pixels can have three corresponding color values in a given color-space. In this specification, the notation $\{R, G, B\}_j$ is short for the RGB values 104 of image "j": $\{R_1, G_1, B_1, R_2, G_2, B_2, \ldots, R_N, G_N, B_N\}$.

Camera characterization techniques can be divided into techniques based on spectral sensitivity and techniques based on color target. The former techniques typically utilize monochromators, radiometers, and the like, and therefore they can be limited to laboratory environments. The latter techniques typically only require reference color targets and known tristimulus values corresponding to the reference color targets. A color target can be captured by the camera being characterized and also measured by a spectrophotometer (for color correction to a standard reference space, e.g., the standard RGB (sRGB) color-space, the color target can be measured once, ideally at the time of camera manufacture) resulting in the RGB values of the color target and their corresponding known target color values (e.g., tristimulus XYZs, sRGB, etc.) In general, techniques used to generate color-transforms between RGB and target color-spaces include three dimensional look-up tables, least-squares polynomial regression and neural networks. For instance, camera characterization using variable length polynomial regression with least squares fitting can use at least 40-60 training samples to obtain an error ΔE (CMC(1:1)) of around 1 unit for a fixed exposure.

A 3×3 color-transform can be used to map color values from the RGB space to the target color space because, to a first order, typical lights and surfaces interact with typical cameras as if reflectances were 3 dimensional. Mapping can be performed by the image color converter utility 150 using an equation $$q_{3\times 1} = M_{3\times n} \cdot \Sigma n \times 1 \tag{1},$$

where n=3, and the color-transform $M_{3\times n}$ 225 is a 3×3 color-transform. As shown in FIG. 2A, a three element vector $\rho_{3\times 1}$ 234 represents the three camera responses $[R, G, B]^T$, and another three element vector $q_{3\times 1}$ 266 represents their corresponding target color values $[r, g, b]^T$. In addition, different 3×3 color-transforms can be used to correct color values of images that have different color-biases, corresponding to different reflectances of a surface acquired by a single camera under different prevalent lights.

In addition, 3×3 color-transforms are independent of changes in the overall illumination irradiance. Hence, the 3×3 color-transforms can correct color values of an image independently of changes in the overall light levels on a fixed scene depicted in the image. At a fixed camera exposure, as the overall light level is scaled up or down by a factor k 135, the RGB values 134 recorded by the camera in turn scale by the factor k 135 (assuming linear sensors). Likewise, the target color values 166 of the corresponding surfaces in the scene can scale by the same factor k 135 (assuming the light level scaling is constant across wavelengths). Therefore, $$M_{3\times3} \cdot k\rho_{3\times1} = k(M_{3\times3} \cdot \rho_{3\times1}) = kq_{3\times1} \quad (1').$$

Accordingly, a 3×3 color-transform remains the same, since the factor k 135 cancels out on both sides of equation (1). Alternatively, for a fixed scene under fixed illumination, a change in camera exposure that induces linear scaling of the RGB values that map to the fixed target color values, corresponds to scaling of the 3×3 color-transform. For typical digital camera usage, mapping RGB values to corresponding non-fixed, target color values (e.g., tristimulus or display RGB values) is of practical interest. Scaling the display color values is typically performed by normalizing to (usually) the bright part of the image. This type of normalization can be carried out using an exposure control algorithm at a time when the image is acquired. Additional mapping of RGB values to color values of the display range is called tone mapping.

Nonetheless, given a 3×3 color-transform, color corrections from RGB values to target color values can result in errors in excess of 10ΔE, for some surfaces. While such a 10ΔE model-related error can be considered high, a color correction based on a 3×3 color-transform has the advantage that it is independent to exposure changes. For example, consider the same surface viewed under different light levels in different parts of a scene. Because a 3×3 color-transform that takes RGB values to target color values (e.g., tristimulus or display RGB values) is independent to changes in scene light levels, a color correction process based on a single such color-transform can be applied on the different parts of the scene.

To reduce model-related error, color corrections based on 3×3 color-transforms can be modified to expand the RGB values 234 from 3 terms to n terms, where n>3, and to use the color-transform $M_{3\times n}$ 225 to transform the expanded RGB values 245 to target color values 266. The base generator utility 110 can receive color values $\{R, G, B\}_j$ of an image "j" from among the set of calibration images 102 and can expand the received color values using a nonlinear base of n functions $f_p(R, G, B)$, where p=1, ..., n>3. Unless specified otherwise, the base generator utility 110 performs the expansion for each of the N pixels of an image. For instance, the base generator utility 110 can expand the RGB values $\{R, G, B\}_j$ 104 of the image "j" to obtain $\{f_1(R_1,G_1,B_1), f_2(R_1,G_1,B_1), \ldots, f_n(R_1, G_1,B_1), f_1(R_2,G_2,B_2), f_2(R_2,G_2,B_2), f_n(R_2,G_2,B_2), f_1(R_N,G_N, B_N), f_2(R_N,G_N,B_N), f_n(R_N,G_N,B_N)\}$ 115. In this specification, the forgoing expansion of the RGB values of the image "j" can be represented using a short-hand notation $\{n>3$ terms $f_p(R,G,B)\}_j$ 115, or using an n×1 vector $\rho_{n\times 1} = [n \text{ terms}: f_p(R,G,B)]^T$ 245.

The color-transform generator utility 120 can receive the expanded RGB values of the image "j" $\{n>3$ terms $f_p(R,G,B)\}_j$ 115 and the corresponding target color values $\{r, g, b\}_j$ 106 and can generate a color-transform $M_{3\times n}$ 125. The color-transform $M_{3\times n}$ 125 can be generated by least-squares regression. Let Q denote a matrix with 3 rows and m columns corresponding to a set of m known target color values for a reflectance target and R denote a matrix with n rows and m columns corresponding camera response values expanded using the n-term basis 115. The least-squares mapping from R to Q can be found using the Moore-Penrose inverse:

$$M = M_{3\times n} \quad (2)$$
$$= Q_{3\times M}(R_{n\times M})^T(R_{n\times M}(R_{n\times M})^T)^{-1}$$
$$= QR^T(RR^T)^{-1}.$$

The base generator utility 110 can expand the three RGB values 104 recorded in a pixel to n values corresponding to the n-term nonlinear base 115. Moreover, because the matrix R represents response of m surfaces to the n-term nonlinear base 115, Equation (2) can be used by the color-transform generator utility 120 to determine the color-transform $M_{3\times n}$ 125 corresponding to the n-term nonlinear base 115. The color-transform $M_{3\times n}$ 125 determined in this manner can be used by the image color converter utility 150 to perform color corrections. Data points corresponding to the training set 102 of digital images are weighted equally as part of the above-noted Moore-Penrose regression. Rather than using the Moore-Penrose regression, a robust regression, such as trimmed median of squares, can be used to generate the color-transform 125. By using a regression based on trimmed median of squares, data points representing outliers (e.g., due to dirty color targets) can be excluded from the evaluation of the color-transform 125.

In order for the color correction based on the color-transform $M_{3\times n}$ 125 to be independent of brightness levels over different regions of a scene depicted in an image, each of the n-terms of the nonlinear base 115 is configured to scale linearly with an intensity scaling factor k 135. Given a function of RGB values that satisfies the equality $$h_p(kR, kG, kB) = k^m g_p(R, G, B) \quad (3),$$

where the scaling factor k represents light intensity and m≠0 represents on order of the function $h_p$, a base-term $f_p$ that is an m-root of the function $h_p$ scales linearly with the light intensity k:

$$f_p(kR, kG, kB) = (h_p(kR, kG, kB))^{\frac{1}{m}} \quad (4)$$
$$= (k^m g_p(R, G, B))^{\frac{1}{m}}$$
$$= k(g_p(R, G, B))^{\frac{1}{m}}$$
$$= kf_p(R, G, B).$$

FIG. 2A shows a nonlinear base term $f_p$ that satisfies equation (4)

$$f_p(R, G, B) = (R^i G^j B^l)^{\frac{1}{i+j+l}}, \quad (5)$$

where the powers $R^i$, $G^j$ and $B^l$ have exponents i, j, l that are rational numbers, and the order m of the product of powers $R^i G^j B^l$ is m=i+j+l. The nonlinear base term $f_p$ in equation (5) scales linearly with a scaling factor k (that represents brightness level of scene depicted in an image), because the scaling factor k factors out of the product of powers $(kR)^i(kG)^j(kB)^l$ raised to a power equal to the order of the product $R^i G^j B^l$, $k^m$, only to be subjected to an order-root (m-root) of $(k^m)^{1/m}$ and to end up being equal to k. When the order of the product $R^i G^j B^l$ associated with the base term $f_p$ is m=0=i+j+l, $f_p(kR, kG,kB)$ is independent of the intensity k, so the zero-root of the product of powers $(kR)^i(kG)^j(kB)^l$ in equation (5) need not be taken.

An example of an order-root of RGB powers that satisfies equation (5) is a nonlinear base term $$f_P(R, G, B) = (R^{-2}G^3)^{-\frac{1}{2+3+0}} = \frac{G^3}{R^2}. \quad (6)$$

For the nonlinear base term $f_p$ in equation (6), the rational exponents of the RGB powers are i=−2, j=3, l=0, and the order of the product $R^i G^j B^l$ associated with the nonlinear base term $f_p$ is m=1. Equation (6) shows that $f_p(kR,kG,kB)=kf_p(R,G,B)$, because $(k^1)^{1/1}$=k. Accordingly, the nonlinear base term $f_p$ given by equation (6) scales linearly with the light intensity k, and can be used by the base generator utility 110, as one of the n terms of the nonlinear base 115, to expand RGB values of input images.

Another example of an order-root of RGB powers that satisfies equation (5) is a nonlinear base term $$f_P(R, G, B) = (R^{1.5}G^{-2})^{\frac{1}{1.5-2+0}} = \left(\frac{R^{1.5}}{G^2}\right)^{-2} = \frac{G^4}{R^3}. \quad (7)$$

For the nonlinear base term $f_p$ in equation (7), the rational exponents of the RGB powers are i=1.5, j=−2, l=0, and the order of product $R^i G^j B^l$ associated with the nonlinear base term $f_p$ is m=−0.5. Equation 7 shows that $f_p(kR,kG,kB)=kf_p(R,G,B)$, because $(k^{-0.5})^{1/(-0.5)}$=k. Accordingly, the nonlinear base term $f_p$ given by equation (7) scales linearly with the light intensity k, and can be used by the base generator utility 110, as one of the n terms of the nonlinear base 115, to expand RGB values of input images.

Other examples of base terms $f_p$ that can be obtained using equation (5) are terms of root polynomials. Root polynomial base terms $f_p$ can be generated by the base generator 110 for exponents i, j, l in equation (5) that are positive integers 1, 2, 3, . . . ; An m-root polynomial base includes order-roots of polynomial terms having a maximum order m. FIG. 2B shows an example of a root polynomial base that is a square-root polynomial base 245 (m=2) and can be represented using the n×1 vector representation 245:

$$\rho_{6\times 1} = [R,G,B,\sqrt{RG},\sqrt{GB},\sqrt{BG}]^T \quad (8).$$

Nine polynomial terms having a maximum order m=2 can be generated. However, the nonlinear polynomial terms $R^2$, $G^2$ and $B^2$ of order m=2 from among the 9 polynomial terms are equivalent to the linear polynomial terms R, G and B of order m=1, respectively, after the order-root (in this case square-root) is taken, in accordance with equation (5). Hence, the square-root polynomial base generated by the base generator utility 110 has 6 independent terms, and the color-transform generator 120 generates a color-transform $M_{3\times 6}$ 225 (m=2) that corresponds to the square-root polynomial base.

Another example of a root polynomial base is a cube-root polynomial base that can be represented using the n×1 vector representation 245:

$$\rho_{13\times 1} = \begin{bmatrix} R, G, B, \sqrt{RG}, \sqrt{GB}, \sqrt{BG}, \sqrt{RG}, \sqrt{GB}, \sqrt{BG}, \\ \sqrt[3]{RG^2}, \sqrt[3]{RB^2}, \sqrt[3]{GB^2}, \sqrt[3]{GR^2}, \sqrt[3]{BG^2}, \sqrt[3]{BR^2}, \sqrt[3]{RGB} \end{bmatrix}^T. \quad (9)$$

Nineteen polynomial terms having a maximum order m=3 can be generated. However, the nonlinear polynomial terms $R^3$, $G^3$ and $B^3$ of order m=3, and $R^2$, $G^2$ and $B^2$ of order m=2 from among the 19 polynomial terms are equivalent to the linear polynomial terms R, G and B of order m=1, respectively, after the order-root (in this case cube-root) is taken, in accordance with equation (5). Hence, the cube-root polynomial base generated by the base generator utility 110 has 13 independent terms, and the color-transform generator 120 generates a color-transform $M_{3\times 13}$ 225 (m=3) that corresponds to the cube-root polynomial base.

Yet another example of a root polynomial base is a fourth-root polynomial base that can be represented using the n×1 vector representation 245:

$$\rho_{25\times 1} = \begin{bmatrix} R, G, B, \sqrt{RG}, \sqrt{GB}, \sqrt{BG}, \sqrt{RG}, \sqrt{GB}, \sqrt{BG}, \\ \sqrt[3]{RG^2}, \sqrt[3]{RB^2}, \sqrt[3]{GB^2}, \sqrt[3]{GR^2}, \sqrt[3]{BG^2}, \sqrt[3]{BR^2}, \sqrt[3]{RGB}, \\ \sqrt[4]{R^3G}, \sqrt[4]{R^3B}, \sqrt[4]{G^3R}, \sqrt[4]{G^3B}, \sqrt[4]{B^3R}, \sqrt[4]{B^3G}, \\ \sqrt[4]{R^2G^2}, \sqrt[4]{G^2B^2}, \sqrt[4]{R^2B^2}, \sqrt[4]{R^2GB}, \sqrt[4]{G^2RB}, \sqrt[4]{B^2RG} \end{bmatrix}^T. \quad (10)$$

Thirty four polynomial terms having a maximum order m=4 can be generated. However, the nonlinear polynomial terms $R^4$, $G^4$ and $B^4$ of order m=4; $R^3$, $G^3$ and $B^3$ of order m=3, and $R^2$, $G^2$ and $B^2$ of order m=2 from among the 34 polynomial terms are equivalent to the linear terms polynomial R, G and B of order m=1, respectively, after the order-root (in this case fourth-root) is taken, in accordance with equation (5). Hence, the fourth-root polynomial base generated by the base generator utility 110 has 25 independent terms, and the color-transform generator 120 generates a color-transform $M_{3\times 25}$ 225 (m=4) that corresponds to the fourth-root polynomial base.

Nonlinear 3×n color-transforms (with n>3) generated based on the nonlinear bases described above in connection with equations (4)-(10) can improve performance of 3×3 color-transforms for regions of an input color-space (e.g., RGB space) where linearity is poor (due to the types of surfaces, sensors or lights). In addition, color correction of images based on any of these 3×n color-transforms scales linearly with linear changes in the overall light level of the images. Thus, color correction based on the 3×n color-transforms corresponding to root polynomial expansions of RGB values (e.g., given in equations (8)-(10)) may perform better than color correction based on 3×3 color-transforms for fixed scenes, illuminations and camera exposures, as well as for a fixed scene and camera exposure, under changing illumination. (Note that these predictions all assume that the camera responses remain in the unsaturated range.)

The nonlinear 3×n color-transforms (n>3) 125 generated by the color-transform generator utility 120 can be stored for later use by the image color converter utility 150. The generated nonlinear 3×n color-transforms 125 can be stored on a storage system associated with the image color corrector system 100. In some implementations, the storage system can be on-board a computer system (e.g., a digital camera, a smartphone, and the like) associated with the image color converter utility 150. In other implementations, the storage system can be in the cloud and communicatively coupled with the image color converter utility 150 via a network.

In operation, the image color corrector system 100 can access an input image 132. The input image 132 can have input color values 144 in an input color-space, e.g., {sR, sG, sB}$_{in}$. The input color values 144 can be a product of the color values 134 (e.g., {R, G, B}$_{in}$) of a scene depicted in the input image 132 and a light intensity level k 135. The latter is determined either by the brightness level of the scene or the exposure level of the camera used to acquire the input image 132. The base generator utility 110 can expand the input color values 144 of the input image 132 in the input color-space to obtain an n-term nonlinear base 145 (where the number of the expanded terms is larger than 3). Note that each of the n terms of the nonlinear base 145 scales linearly with the light intensity level k 135, as described above in connection with equations (5)-(10). The expansion performed by the base generator utility 110 corresponds to the color-transform $M_{3 \times n}$ 125 that can be used by the image color converter utility 150 to obtain a color-corrected output image 162. For example, if the available color-transform is $M_{3 \times 6}$, then the base generator utility 110 expands the input color values 144 of the input image 132 using the square-root polynomial base defined by equation (8). As another example, if the available color-transform is $M_{3 \times 13}$, then the base generator utility 110 expands the input color values 144 of the input image 132 using the cube-root polynomial base defined by equation (9). Finally, the image color converter utility 150 uses the available color-transform $M_{3 \times n}$ 125 to map the expanded input color-values 145 corresponding to the input image 132 in the input color-space (e.g., RGB space) to color values 166 of the output image 162 in an output color-space, e.g., k{r, g, b}$_{out}$. As described above in connection with equations (5)-(10), the light intensity level k 135 that scales the input color-values 144 of the input image 132, also scales the output color-values 166 of the output image 162.

Another way to improve performance of 3×3 color-transforms for regions of an input color-space where a 3×3 color-transform works less well, and thus reduce the model-error of the 3×3 color-transforms, is to apply a polynomial expansion to the RGB values of an input image. For example, the RGB values for each pixel of the input image can be expanded based on a second order polynomial to a $\rho_{9 \times 1}$ vector $$\rho_{9 \times 1} = [R, G, B, R^2, G^2, B^2, RG, RB, GB]^T \quad (11).$$

As another example, the RGB values for each pixel of the input image can be expanded based on a third order polynomial to a $\rho_{19 \times 1}$ vector $$\rho_{19 \times 1} = \begin{bmatrix} R, G, B, R^2, G^2, B^2, RG, RB, GB, \\ R^3, G^3, B^3, GR^2, RG^2, GB^2, BG^2, BR^2, RB^2, RGB \end{bmatrix}^T. \quad (12)$$

As yet another example, the RGB values for each pixel of the input image can be expanded based on a fourth order polynomial to a $\rho_{34 \times 1}$ vector $$\rho_{34 \times 1} = \begin{bmatrix} R, G, B, R^2, G^2, B^2, RG, RB, GB, \\ R^3, G^3, B^3, GR^2, RG^2, GB^2, BG^2, BR^2, RB^2, RGB, \\ R^4, G^4, B^4, GR^3, RG^3, GB^3, BG^3, BR^3, RB^3, \\ R^2G^2, B^2G^2, R^2B, GBR^2, RBG^2, RGB^2 \end{bmatrix}^T. \quad (13)$$

Using the polynomial expansions of equations (11)-(13), the RGB values for each pixel of the input image can be mapped to 9, 19 and 34 values respectively. Color-correction transforms $M_{3 \times 9}$, $M_{3 \times 19}$ and $M_{3 \times 34}$ corresponding to the polynomial expansions of equations (11)-(13) can be generated based on equation (2), for instance. For fixed exposure, color-transforms based on polynomial expansions can improve color correction with respect to 3×3 color-transforms. However, if the RGB values are scaled by a light intensity level k, the individual terms of the polynomial expansions of equations (11)-(13) scale by k, $k^2$, $k^3$ or $k^4$. Thus, if the RGB values scale by k (physically this is the effect of changing the exposure, for instance), then the color-correction transforms $M_{3 \times 9}$, $M_{3 \times 19}$ and $M_{3 \times 34}$ corresponding to the polynomial expansions of equations (11)-(13) must be modified. This need can be a significant challenge in real images. For example, a reference target can be placed in a bright, well exposed area of a scene, and then the area of the scene can be shaded. In such case, the RGB values corresponding to no shade and shade can be different by scaling factors of 10 s to 1. Accordingly, a digital camera that performs color correction using color-transforms based on polynomial expansions, can map the in-shade target to different colors than the target not in the shade.

Figure 3A:
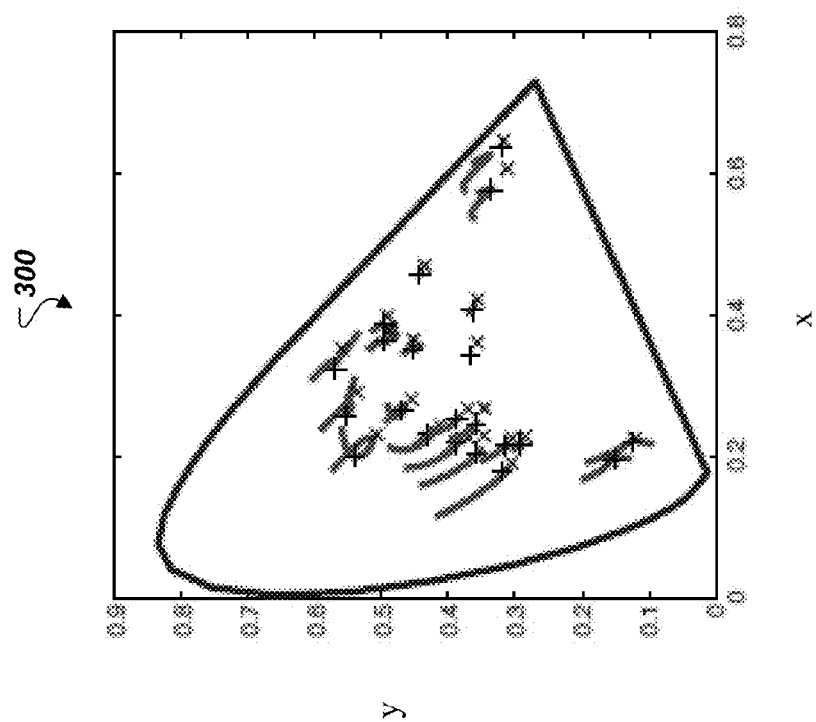
FIG. 3A shows color corrections obtained by applying alternative color correction techniques.
Figures 3B, 3C, 3D:
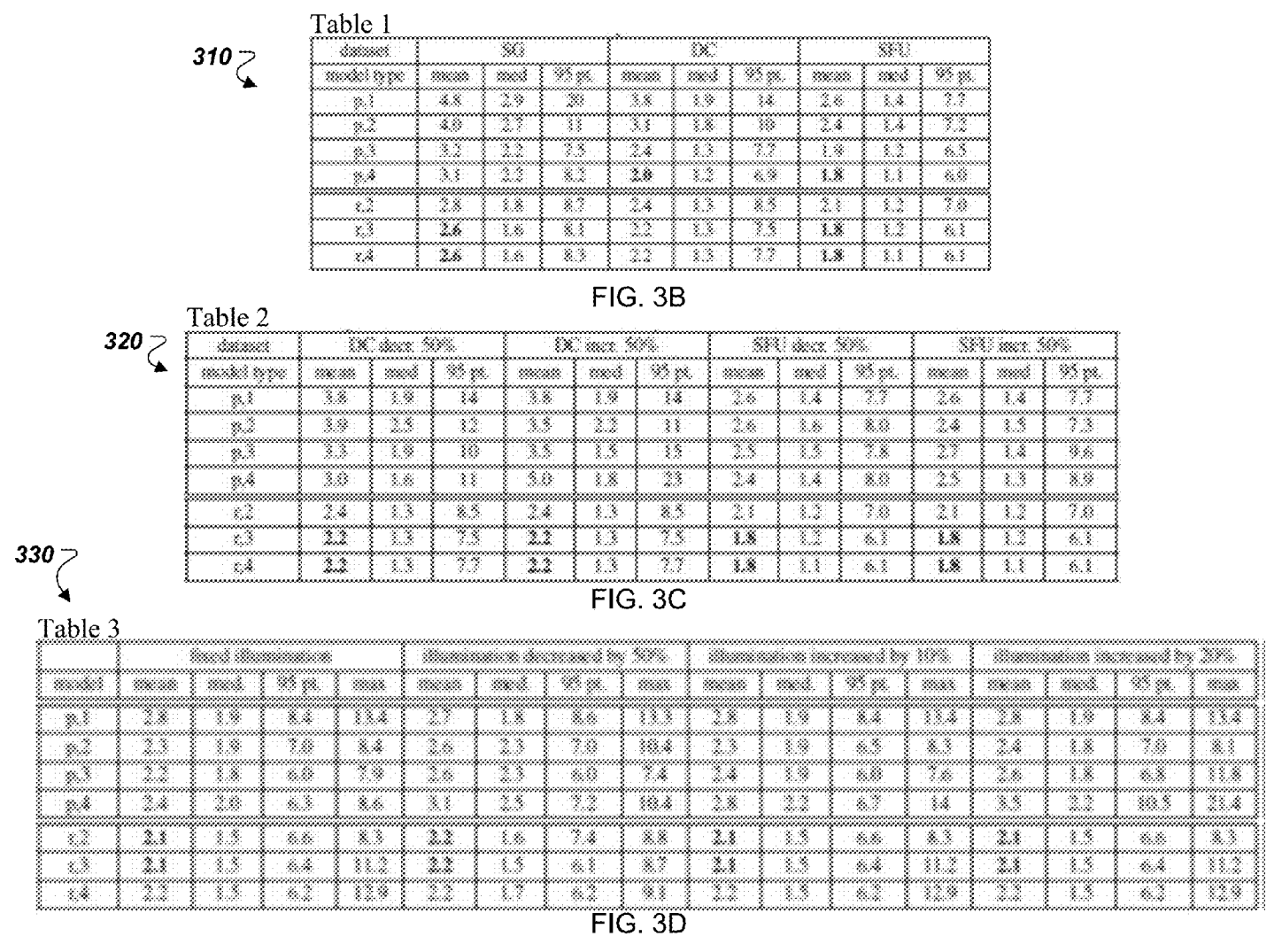

FIG. 3 shows color correction results obtained by using a 3×25 color-transform based on a fourth-root polynomial base of equation (10) and other color correction results obtained by using a 3×34 color-transform based on a fourth-order polynomial base of equation (13). Polynomial and root polynomial bases were used to determine corresponding color-transforms by using the Simon Frasier University (SFU) 1995 reflectance dataset. Next, a number of reflectances (RGB values 104) from this dataset were selected and their true xy chromaticity coordinates 106, x=X/(X+Y+Z) and y=Y/(X+Y+Z), were plotted using the symbol "x" in graph 300. The solid "horseshoe" delimits the set of all colors. The chromaticity coordinates 166 were determined using a 3×25 color-transform based on the fourth-root polynomial base of equation (10), and were plotted using the symbol "+" in the graph 300. Finally, the chromaticities also were determined using a 3×34 color-transform based on the fourth-order polynomial base of equation (13) for a number of intensity scales k 135 ranging from 0.1 to 1. In FIG. 3, one can see the chromatic shifts (the ranges of which are represented by lengths of the solid lines) induced by the 3×34 color-transform based on the fourth-order polynomial base of equation (13) as one scales the intensity of the light. In contrast, the chromaticity coordinates 166 determined using a 3×25 color-transform based on the fourth-root polynomial basis of equation (10) are invariant to the intensity level k, because for different intensity scales ranging from 0.1 to 1, the same "+" coordinates are obtained.

To further compare the performance of polynomial- and root polynomial-based color correction, synthetic data simulations and a real data experiment were performed using the image color correction system 100. To perform the synthetic data simulations, a Sony™ DXC-930™ camera sensor sensitivities were used to integrate spectral data from three surface reflectance datasets 102. First dataset includes 96 reflectances of the X-rite SG color checker (border patches excluded), the second dataset contains 180 patches of the Macbeth DC color checker (again border patches were excluded) and the last one 1995 surfaces collated at the Simon Fraser University. For each dataset, a simulation was performed, in which the Sony™ sensor sensitivities and the color matching functions were integrated under D65 illuminant producing corresponding sets of camera responses (RGB values) 104 and XYZ values 106.

Spectra calculations were carried out for 31 spectral channels—400-700 nm sampled every 10 nm. Next, the regression models were built (using the color-transform generator utility 120) based previously generated polynomial and root polynomial terms (using the base generator utility 110). For each of the four datasets, a leave-one-out validation was performed: A model was built using all but one of the surfaces from the dataset and that model was tested on the remaining patch; this was repeated for all the patches in the dataset and calculated mean ΔE in the CIELUV color-space. Table 1 (310 in FIG. 3B) shows synthetic data simulation results for fixed illumination condition. The errors obtained for four datasets are given as the mean, median and 95 percentile error in the CIELUV color-space.

Next, for the DC and SFU datasets, an increase and decrease in the scene irradiance were simulated by multiplying the earlier calculated camera sensor responses 104 and the ground truth XYZ values 106 by factors 0.5 and 1.5. These corresponding sets of RGB values and XYZ values were used to test the earlier learned original scene irradiance color-transforms based on polynomial and root polynomial bases. Table 2 (320 in FIG. 3C) shows synthetic data simulation results for the DC and SFU dataset as the light level was decreased and increased. The errors obtained for four datasets are given as the mean, median and 95 percentile error in the CIELUV color-space.

Moreover, a real camera characterization was performed. The experimental set-up was as follows. The X-rite SG color chart was positioned in a dark room, illuminated with a tungsten bulb light and imaged with Nikon™ D60™ camera. First, an image of the color chart was captured and XYZ values of each of the 96 patches were measured using Photo Research PR-650 spectrophotometer. Next, the level of the light was decreased by roughly the factor of two using the dimmer and the image-capture and patch measurements were repeated (for the same camera settings). The linear 16-bit images were extracted from the camera raw images using DCRAW program. The dark level was captured with the lens cap on and subtracted from the camera responses. Data obtained in this manner was used for the first lighting condition to derive a set of color-transforms based on polynomial and root polynomial bases as described above in connection with FIGS. 1 and 2A-2B. The color-transforms were evaluated using the leave-one-out method in the same manner as in the earlier simulations. Table 3 (330 in FIG. 3D) shows Nikon™ D60™ characterization results. The errors are given as the mean, median, 95 percentile and maximum error in the CIELUV color-space.

The results of the validation can be seen in the second column (fixed illumination) in Table 3 (330). The third column in the same table contains the results of testing these models after the intensity of the light was decreased. In addition, an increase in the light intensity was simulated by multiplying the original (first lighting condition) camera sensor responses and the measured XYZ values by factors 1.1 and 1.2. Again, the resulting RGBs and XYZs were used to test the earlier learned color-transforms based on polynomial and root polynomial bases. The results of these simulations can be seen in the last two columns of Table 3 (330).

A comparison of the results of the color corrections based on polynomial and root polynomial bases in a fixed illumination scenario shows that the color-transforms based on root polynomial bases usually outperform the color-transforms based on polynomial bases, including those of higher order. However, the difference between the best color-transforms based on high order polynomial bases and the root polynomial bases is not large. Table 1 (310) also shows that, for the DC dataset, the color-transforms based on root polynomial bases performs worse than the color-transforms based on polynomial bases, but for the smaller SG dataset and the largest and most relevant SFU dataset, the situation is reversed.

The results from Tables 2 (320) and 3 (330) show that performance of the color-transforms based on polynomial bases deteriorates under change of scene irradiance/exposure condition; whereas performance of the color-transforms based on the root polynomial bases remains invariant. An important observation is the fact that the root polynomial results are always better than the results obtained for the 3×3 color-transforms ((p,1) in Tables 1 (310), 2 (320) and 3 (330)), which are invariant to change of exposure. In the experiments reported here, only a slight increase in the scene irradiance/exposure is simulated, because for the larger increases the color-transforms based on polynomial bases fail completely, which results e.g. in mapping camera responses to negative XYZ values and consequently meaningless LUV errors. However, the results from Tables 2 (320) and 3 (330), as well as FIG. 3 suggest that naïve color correction using color-transforms based on polynomial bases applied to color values at different exposures can result in high error. Conversely, color correction using color-transforms based on root polynomial bases works well independent of exposure.

With regard to the real camera experiment, similar trends can be observed. For example, the color-transforms based on root polynomial bases performs better than the color-transforms based on polynomial bases, in particular significantly better than the 3×3 color-transform and is invariant with respect to the change of illumination intensity. Moreover, color-transforms based on polynomial bases fails under the change of illumination condition. The smaller errors for that camera (than those for the simulated Sony™ sensors and the SG chart) suggest that Nikon™ D60™ sensors are more colorimetric than the Sony™ DXC-930™ sensors.

Another observation about the color-transforms based on root polynomials bases is that, the results obtained for different orders are relatively similar. Usually the largest improvement over the 3×3 color-transform takes place in the second order root polynomial by adding just three extra terms into the base. The results of the third and the fourth order root polynomials are very similar and only slightly better than those of the second order. Tables 1 (310) and 3 (330) show that the color-transform based on the $2^{nd}$ order root polynomial base (6 terms) outperforms even the color-transform based on the $4^{th}$ order polynomial base (34 terms) for the SG dataset and for the Nikon™ camera; and is comparable to the color-transform based on the $3^{rd}$ order polynomial base (19 terms) for the DC and SFU datasets. Thus, the smaller number of terms of root polynomial bases is their yet another advantage over the polynomials bases.

In some implementations, the image color corrector system 100 can determine color-bias corresponding to the images from the set of calibration images 102. An example of a color bias can be the color of the prevailing illuminant of a scene depicted in an image, and as such, the image colors at acquisition can be biased towards the color of the illuminant. The color-bias can be expressed as three values $CB=\{R_B, G_B, B_B\}$ associated with the image and specific to the illuminant color. Images of the set of calibration images 102 can be classified in a finite quantity of color-bias bins. An image "j" is considered to belong to a color-bias bin $CB_i=\{R_{Bi}, G_{Bi}, B_{Bi}\}$, if the color-bias $CB_j$ of the image "j" is in a color range $\{R_{Bi}-\Delta R<R_{Bj}\leq R_{Bi}+\Delta R, \quad G_{Bi}-\Delta G<G_{Bj}\leq G_{Bi}+\Delta G, \quad B_{Bi}-\Delta B<B_{Bj}\leq B_{Bi}+\Delta B\}$. An example of a color-bias bin $CB_1$ is a blue sky bin; another example of a color-bias bin $CB_2$ is a sodium lamp bin; and so on and so forth. In some instances, the images from the set of calibration images 102 can have associated metadata including their respective color-bias values. In such instances, the image color corrector system 100 can simply access the corresponding color-bias values of the images from the set of calibration images 102. In other instances, the image color corrector system 100 can detect the corresponding color-bias values of the images from the set of calibration images 102 by using specific algorithms for color-bias detection.

Once the color-bias values of the images from the set of calibration images 102 has been determined, the image color corrector system 100 can group the images from the set of calibration images 102 in a finite quantity of color-bias groups corresponding to the finite quantity of color-bias bins. For instance, a first color-bias group of the images from the set of calibration images 102 includes images having color-bias values corresponding to the color-bias bin $Cb_1$; a second color-bias group of the images from the set of calibration images 102 includes other images having color-bias values corresponding to the color-bias bin $Cb_2$; and so on, and so forth. At this point, the image color corrector system 100 can use the input color values 104-CB of the images in each color-bias group in the input color-space and their corresponding output color values 106-CB in the output color-space to generate determine an associated color-transform $M_{3\times n}$ 125-CB corresponding to the color-bias CB of the color-bias group.

For instance, the base generator utility 110 can expand the input color values 104-CB1 of images of the first color-bias group corresponding to a first color-bias $CB_1$. The color-transform generator utility 120 can generate a color-transform $M_{3\times n}(CB_1)$ 125-$CB_1$ corresponding to the first color-bias $CB_1$ associated with the first color-bias group by using the expanded input color values 115-CB1 and the corresponding output values 106-CB1 of the images of the first color-bias group. The generated color-transform $M_{3\times n}(CB_1)$ 125-$CB_1$ corresponding to the color-bias $CB_1$ can be stored on persistent storage associated with the image color corrector system 100.

Further, the base generator utility 110 can expand the input color values 104-CBi of images of the $i^{th}$ color-bias group corresponding to an $i^{th}$ color-bias $CB_i$, where the color-bias index i≥2. The color-transform generator utility 120 can generate a color-transform $M_{3\times n}(CB_i)$ 125-$CB_i$ corresponding to the $i^{th}$ color-bias $CB_i$ associated with the $i^{th}$ color-bias group by using the expanded input color values 115-CBi and the corresponding output values 106-CBi of the images of the $i^{th}$ color-bias group. The generated color-transform $M_{3\times n}(CB_i)$ 125-$Cb_i$ corresponding to the color-bias $CB_i$ also can be stored on persistent storage associated with the image color corrector system 100. A color-transform $M_{3\times n}(CB_i)$ from among the stored color-transforms $M_{3\times n}(CB_1)$, $M_{3\times n}(CB_2)$, . . . can be selected to correct color of an input image that has a color-bias $CB_i$.

Figure 4:
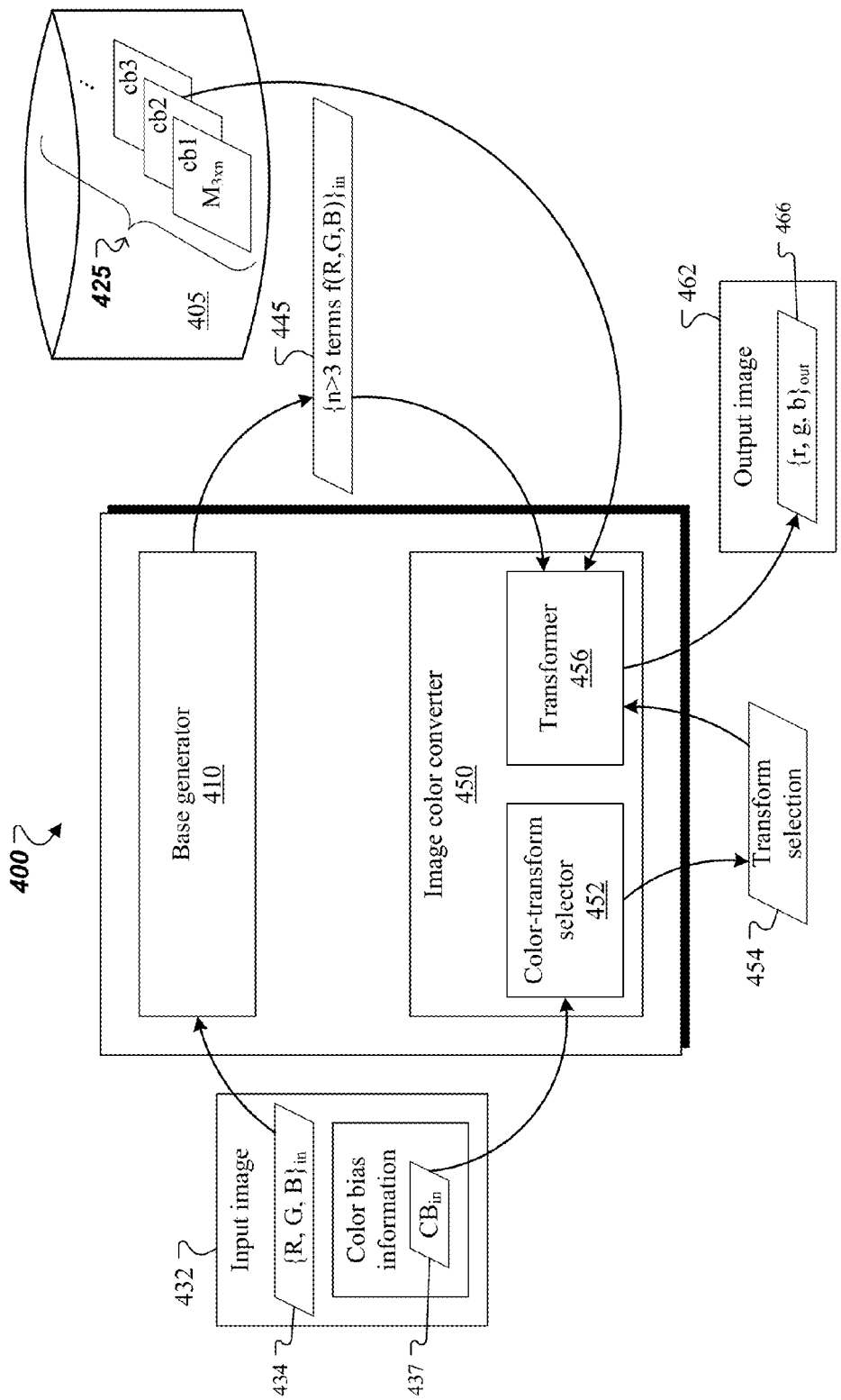
FIG. 4 shows another example of a system used to map color values of a digital image from an input color-space to an output color-space.

FIG. 4 shows an example of a system 400 that uses predefined color-transforms to correct color values of input images from an input color-space to an output color-space based on color-bias values of the input images. The system 400 can be part of a computer system, e.g., a digital camera, a smartphone, a mobile computer, or the like. Further, the system 400 can include at least portions of the color corrector system 100 described above in connection with FIG. 1. The system 400 includes a base generator utility 410 and an image converter utility 450. Moreover, the image converter utility 450 can include a color-transform selector module 452 and a transformer module 456. In some implementations, the utilities of the system 400 can include instructions encoded on persistent memory of the computer system, that when executed by one or more hardware processors of the computer system cause the computer system to perform aspects of the disclosed technology. In some implementations, the utilities of the system 400 can be implemented as processing electronics, e.g., ASICs or graphical processors or both, configured to perform aspects of the disclosed technology. In some other implementations, the utilities of the system 400 can be implemented in a combination of software and hardware. The system 400 is communicatively coupled with persistent storage 405 configured to store multiple color-transforms 425, each of the color-transforms corresponding to an associated color-bias.

The system 400 can receive an input image 432 including color values 434 in an input color-space. For example, the input color-space can be an RGB space in which the color values corresponding to pixels of the input image 432 are dependent of a sensor that acquired the input image 432. In addition, the system 400 can obtain color-bias information $CB_{in}$ 437 associated with the input image 432. The color-bias information $CB_{in}$ includes prevalent color values of the input image $\{R_B, G_B, B_B\}_{in}$ in the input color-space. In some cases, the color-bias information $CB_{in}$ 437 can be included in metadata associated with the input image 432, and the system 400 can receive the color-bias information $CB_{in}$ 437 along with the input image. In other cases, the system 400 can determine the color-bias values $\{R_B, G_B, B_B\}_{in}$ of the input image by applying appropriate color-bias detection algorithms.

The base generator utility 410 can expand the input color values 434 of the input image 432. The expanded input color values 445 form a nonlinear base of n terms, where n>3, such that each of the n nonlinear terms of the base scales linearly with the light level of the input image 432. The light level corresponds to either exposure of the camera that acquired the input image 432 or the brightness of a scene depicted in the input image 432, or both. In general, the n-terms of the nonlinear base are generated by the base generator utility 410 by using any one of the equations (5)-(10).

The color-transform selector module 452 of the image color converter utility 450 can access the obtained color-bias information $CB_{in}$ 437 and can provide a color-transform selection 454 to the transformer module 456. The color-transform selector module 452 is configured to select a color-transform $M_{3\times n}(CB_i)$ from among the plurality of color-transforms 425 stored on the persistent storage 405 that corresponds to the color-bias $CB_{in}$ 437 of the input image 432. The selected color-transform $M_{3\times n}(CB_i)$ is said to correspond to the color-bias 437 of the input image 437 if the latter is in a color-bias range ΔCB associated with the selected color-transform $M_{3\times n}(CB_i)$: $CB_i-\Delta CB<CB_{in}<CB_i+\Delta CB$. For example, if the color-bias $CB_{in}$ 437 of the input image 437 is a tone of blue, then the color-transform selector module 452 selects the color-transform $M_{3\times n}$(blue-sky). As another example, if the color-bias $CB_{in}$ 437 of the input image 437 is a tone of yellow, then the color-transform selector module 452 selects the color-transform $M_{3\times n}$(sodium lamp).

The transformer module 456 retrieves the color-transform $M_{3\times n}(CB_i)$ corresponding to the color-bias $CB_{in}$ of the input image 432 and uses the retrieved color-transform to transform the expanded color-values 445 of the input image 432 in the input color-space to obtain output color values 466 of an output image 462 in a target color-space. The target color-space can be the XYZ (or sRGB) space and the output color values 466 can be xyz tristimulus (or sRGB) values. The color-corrected output image 462 can be displayed on a display device associated with the computer system, or can be sent to a printer device communicatively coupled with the computer system.

Figure 5:
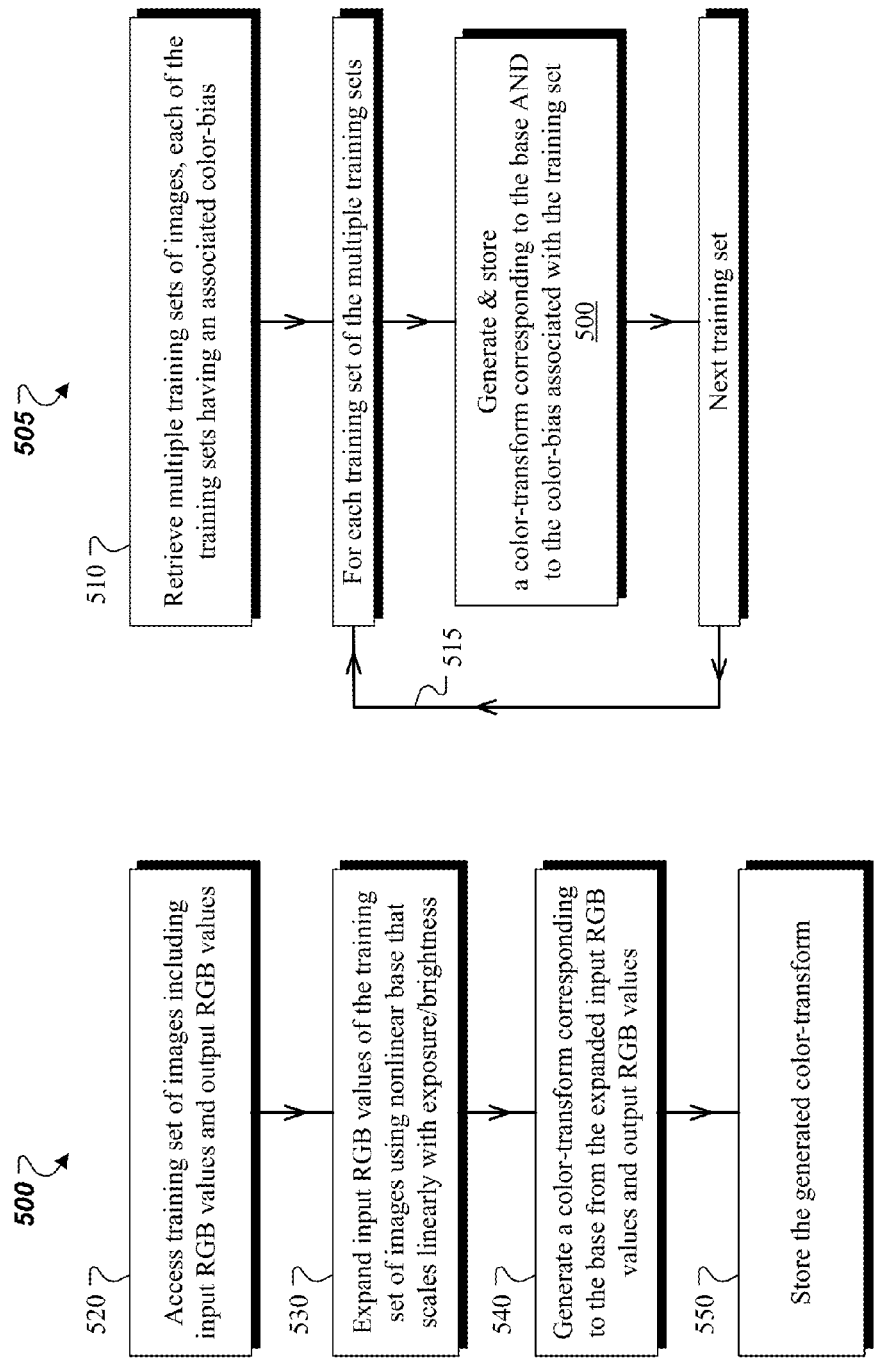
FIGS. 5A-5B show flow charts corresponding to examples of processes used to generate color-transforms.

FIG. 5A shows a flow chart corresponding to an example of a process used to generate a color-transform. In some implementations, the process 500 can be executed by a computer system in conjunction with system 100 to generate a color-transform in accordance with the technology described in this specification.

At 520, a training set of images including color values in an input color-space and corresponding (true) color values in a target color-space is accessed. In some implementations, the input color-space can be an RGB space for which the RGB values depend on a sensor used to acquire the images of the training set, and the target color-space (also referred to as an output color-space) can be an XYZ (or sRGB or YCbCr) space for which the true, tristimulus XYZ (or sRGB or YCbCr) values are independent of the sensor used to acquire the images of the training set. Additionally, the target color correction can also be the camera RGB for a specified illumination color (e.g., white light.) These implementations of process 500 correspond to training of color-transforms used to calibrate camera sensors, for instance. In other implementations, the input color-space can be any one of the XYZ, sRGB or YCbCr spaces and the output color-space can be another one of the XYZ, sRGB or YCbCr spaces. These latter implementations of process 500 correspond to training of color-transforms used to retrofit camera sensors that are already configured to transform camera RGB values to color values of one of the tristimulus XYZ, sRGB or YCbCr spaces.

At 530, the color values of the training set of images in the input color-space are expanded using a nonlinear base that scales linearly with corresponding exposure/brightness levels. The nonlinear base has a quantity of terms larger than three. Terms of the nonlinear base can be generated as functions f(R,G,B) including corresponding products of RGB powers raised to respective inverse-order of the products. For example, each of the functions f(R,G,B) can include an associated product of RGB powers that is raised to an inverse-order of the associated product, according to equation (5), where an order of the associated product of RGB powers is defined as a sum of rational exponents of R, G and B factors of the product of RGB powers. As another example, the functions f(R,G,B) can be terms of an order-root RGB polynomial. For instance, the order-root RGB polynomial can be a 6-term square-root polynomial, and the terms of the square-root polynomial are $\{R, G, B, (RG)^{1/2}, (GB)^{1/2}, (BR)^{1/2}\}$, as described above in connection with Equation (8). Further, the order-root RGB polynomial is a 19-term cube-root polynomial, and the terms of the cube-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}\}$, as described above in connection with Equation (9). Furthermore, the order-root RGB polynomial is a 25-term fourth-root polynomial, and the terms of the fourth-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}, (R^3G)^{1/4}, (R^3B)^{1/4}, (G^3B)^{1/4}, (G^3R)^{1/4}, (B^3G)^{1/4}, (B^3R)^{1/4}, (R^2G^2)^{1/4}, (R^2B^2)^{1/4}, (G^2B^2)^{1/4}, (R^2GB)^{1/4}, (G^2RB)^{1/4}, (B^2RG)^{1/4}\}$, as described above in connection with Equation (10).

At 540, a color-transform corresponding to the base is generated from the expanded color values in the input color-space and the corresponding color values in the target color-space. The color-transform can be generated by regression, for example, in accordance with equation (2). The generated color-transform can be an 3×n matrix (where n>3), configured to map n values of the nonlinear base terms to the three color values of a target color-space, as described above in connection with FIG. 2A.

At 550, the generated color-transform is stored on persistent storage. The stored color-transform can be used to transform color values of other images in the input color-space to color values in the target color-space. In some implementations, the color-transform stored on the persistent storage can be retrieved via a network by computer systems to correct the color of the other images. In some implementations, the persistent storage can be local to computer systems that access the stored color-transform to correct the color of the other images.

FIG. 5B shows a flow chart corresponding to another example of a process 505 used to generate multiple color-transforms, such that each of the multiple color-transforms is generated to correspond to an associated color-bias. In some implementations, the process 505 can be executed by a computer system in conjunction with system 100 and process 500 to generate the multiple color-transforms, in accordance with the technology described in this specification.

At 510, multiple training sets of images are retrieved. Each of the retrieved training sets has an associated color-bias and includes color values in the input color-space and corresponding output color values in the target color-space.

At 515, a loop of process 505 executes the process 500 for each training set of the multiple training sets. The process 500 generates and stores a color-transform corresponding to an n-term nonlinear base and to the color-bias associated with the training set. The nonlinear base includes n>3 terms and scales linearly with the exposure/brightness level, as described above in connection with FIGS. 1 and 5A. In this case, the process 500 is applied iteratively (505) to each training set of the multiple training sets to expand the color values of the training set in the input color-space using the nonlinear base; to generate a color-transform corresponding to the color-bias associated with the training set from the expanded color values of the training set in the input color-space and the corresponding color values of the training set in the target color-space; and to store the generated color-transform corresponding to the color-bias.

In this manner, an output of the process 505 is multiple color-transforms that are stored on persistent storage, such that each of the multiple color-transforms is generated to correspond to an associated color-bias. A selected color-transform corresponding to a specified color-bias can be retrieved from among the stored multiple color-transforms by a computer system to transform color values of other images in the input color-space that have the specified color-bias to color values in the target color-space.

Figure 6:
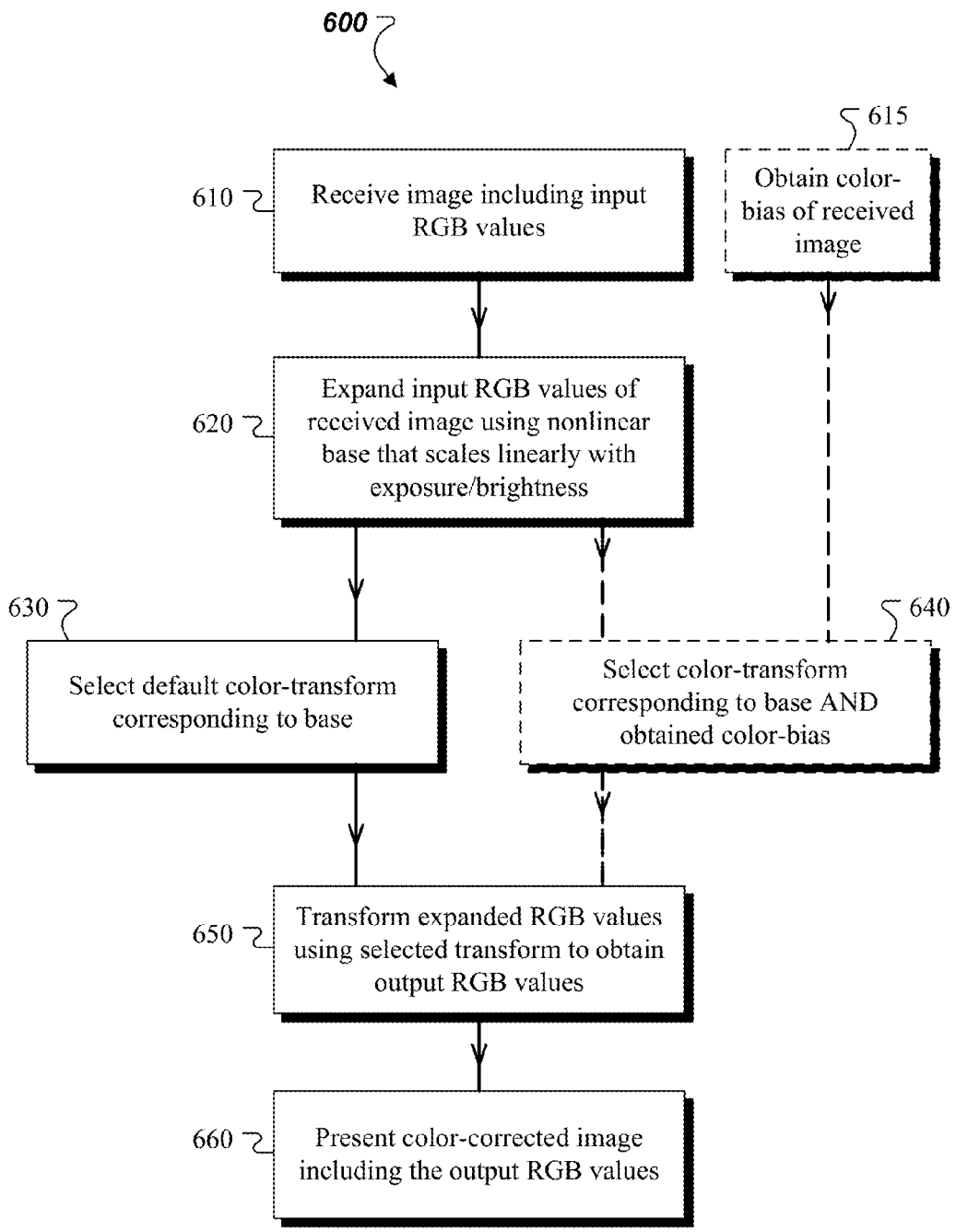
FIG. 6 shows a flow chart associated with a process used to map color values of a digital image from an input color-space to an output color-space.

FIG. 6 shows a flow chart associated with a process 600 used to correct color of digital images. In some implementations, the process 600 can be executed by a computer system, for example by a digital camera, or by a smart phone or a mobile computer that includes a sensor that acquired the digital images. In conjunction with system 400 (or 100), the process 600 can correct color values of an image that depend on the sensor that acquired the image to obtain, in accordance with the described technology, a color-corrected image having target color values that are independent on the sensor that acquired the image.

At 610, an image including color values in an input color-space is received. In some implementations, the input color-space can be the RGB space, for which the RGB values depend on the sensor used to acquire the image. In these implementations of process 600, a target color-space (also referred to as an output, display or print color-space) can be an XYZ (or sRGB or YCbCr) space for which the xyz (or sRGB or YCbCr) values are independent on the sensor used to acquire the received image. In this case, the process 600 is applied to an (un-processed) image as-acquired by the sensor. In other implementations, the input color-space can be any one of the XYZ, sRGB or YCbCr spaces and the output color-space can be another one of the XYZ, sRGB or YCbCr spaces. These latter implementations of process 600 correspond to a camera that already has been configured to transform camera-RGB values to color values in one of the tristimulus XYZ, sRGB or YCbCr spaces, such that the process 600 is applied to a pre-processed image. In this case, a 3×3 color-transform can be retrieved by the computer system from persistent storage prior to starting process 600. The retrieved 3×3 color-transform can map the RGB values that depend on the sensor used to acquire the image to the color values in the input color-space.

At 620, the color values of the image in the input color-space are expanded using a nonlinear base that scales linearly with exposure/brightness. The non-linear base used to perform the expansion has a corresponding color-transform stored on persistent storage (e.g., 405) and is available to the process 600. The color-transform available to the process 600 can be a 3×n matrix, where n>3. Accordingly, the nonlinear base has a quantity of terms n. Terms of the nonlinear base can be generated as functions $f_p(R,G,B)$ including corresponding products of RGB powers raised to respective inverse-order of the products, where p=1, 2, . . . , n>3, to scale linearly with exposure/brightness levels. Examples of nonlinear terms that scale linearly with exposure/brightness levels are described above in connection with Equations (3)-(7). A nonlinear base used by process 600 can be an order-root polynomial. Examples of order-root polynomials are described above in connection with equation (8)-(10).

In some implementations, at 630, a default color-transform corresponding to the base used at 620 is selected. For example, at 620, the computer system can expand the color values in the input space using a specific nonlinear base that has n>3 terms and scales linearly with exposure/brightness levels. In this case, the computer system retrieves from persistent storage (e.g., 405) a 3×n color-transform that was trained, in accordance with process 500, using the (same) specific nonlinear base used at 620. However, if another 3×n color-transform, which was trained using another nonlinear base different from the specific nonlinear base, were stored in the persistent storage, the other 3×n color-transform would not be retrieved by the computer system at 630.

Optionally, at 615, a color-bias of the received image is obtained. For example, to obtain the color-bias of the image the computer system can determine the color-bias of the image. The color-bias of the image can be determined using color-bias detection algorithms. An example of color bias detection is illuminant estimation. Images acquired by a camera have colors biased towards the color of prevailing illumination. Illuminant estimation algorithms can estimate the illuminant color bias. As another example, to obtain the color-bias of the image the computer system can access metadata associated with the received image. At 640, a color-transform corresponding to the base used at 620 and the obtained color-bias is selected. For example, the computer system can expand the color values in the input space using a specific nonlinear base that has n>3 terms and scales linearly with exposure/brightness levels. In addition, the persistent storage (e.g., see 405) associated with the computer system can store multiple 3×n color-transforms corresponding to respective color-biases (e.g., see 425). Note that the latter 3×n color-transforms were trained, in accordance with process 550, using the (same) specific nonlinear base used at 620. The computer system can match the obtained color-bias of the received image to a color-bias associated with one of the stored multiple 3×n color-transforms. A match occurs if the obtained color-bias of the received image is in a predefined color range from the color-bias associated with one of the stored multiple 3×n color-transforms. The one of the stored multiple 3×n color-transforms corresponding to the matched color-bias can be retrieved by the computer system.

At 650, the expanded color values of the image in the input color-space are transformed using the selected transform to obtain color values of the image in the target color-space. This transformation can be performed in accordance with equation (1). The output of the transformation is a color-corrected instance of the image including the color values of the image in the target color-space.

At 660, the color-corrected image including the color values of the image in the target color-space is presented. In some implementations, the target color-space is the XYZ space, and the color-corrected image can be presented on a display device associated with the computer system. In other implementations, the target color-space is the sRGB space, and the color-corrected image can be sent to a printer device that is communicatively coupled with the computer system.

FIG. 7 is a block diagram of an example of a computer system 700 operated according to the technologies described above in connection with FIGS. 1-6. The computer system 700 can include memory interface 702, one or more data processors, image processors and/or processors 704, and peripherals interface 706. Memory interface 702, one or more processors 704 and/or peripherals interface 706 can be separate components or can be integrated in one or more integrated circuits. Processors 704 can include one or more application processors (APs) and one or more baseband processors (BPs). The application processors and baseband processors can be integrated in one single process chip. The various components in computer system 700, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the computer system 700. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of the computer system 700.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computer system 700 is intended to operate. For example, a computer system 700 can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the computer system 700 can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch surface controller 742 and/or other input controller(s) 744. Touch-surface controller 742 can be coupled to a touch surface 746 (e.g., a touch screen or touch pad). Touch surface 746 and touch surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In some implementation, a pressing of the button for a first duration may disengage a lock of the touch surface 746; and a pressing of the button for a second duration that is longer than the first duration may turn power to computer system 700 on or off. The user may be able to customize a functionality of one or more of the buttons. The touch surface 746 can, for example, also be used to implement virtual or soft buttons and/or a keyboard, such as a soft keyboard on a touch-sensitive display.

In some implementations, computer system 700 can present recorded audio and/or video files, such as MP3, AAC, and MPEG files. In some implementations, computer system 700 can include the functionality of an MP3 player, such as an iPod™. Computer system 700 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate Global Navigation Satellite System (GNSS) (e.g., GPS) and navigation-related processes and instructions; camera instructions 770 to facilitate camera-related processes and functions; magnetometer data and calibration instructions 772. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750.

Memory 750 can include color calibration instructions and data 774 as described above with respect to FIGS. 1-3 and 5A-5B. For instance, the color calibration instructions correspond to the processes 500 and 505. Further, the memory 750 can include color correction instructions and data 776 as described with respect to FIGS. 4 and 6. For example, the color correction instructions correspond to the process 600. Furthermore, color calibration and correction data 774, 776 includes the stored 3×n color-transforms 125 or 425, or both, for instance.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the computer system 700 may be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving an image, where a plurality of pixels of the received image have input red, green and blue (RGB) values that depend on a sensor used to acquire the image;
  expanding, by an image processor, the input RGB values of the plurality of pixels using a nonlinear base, where terms of the nonlinear base correspond to functions f(R, G,B), where each of the functions f(R,G,B) has an associated value and f(kR,kG,kB) equals k times the associated value, for any scalar k>0, such that each term of the nonlinear base scales linearly with exposure of the image or brightness of a scene depicted in the image; and adjusting, by the image processor, the image by transforming the expanded input RGB values of the image to output RGB values that are independent of the sensor used to acquire the image and scale linearly with the exposure of the image or the brightness of the scene depicted in the image.

2. The method of claim 1, where the nonlinear base is an order-root RGB polynomial.

3. The method of claim 2, where the order-root RGB polynomial is a square-root polynomial, and the terms of the square-root polynomial are $\{R, G, B, (RG)^{1/2}, (GB)^{1/2}, (BR)^{1/2}\}$.

4. The method of claim 2, where the order-root RGB polynomial is a cube-root polynomial, and the terms of the cube-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}\}$.

5. The method of claim 2, where the order-root RGB polynomial is a fourth-root polynomial, and the terms of the fourth-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}, (R^3G)^{1/4}, (R^3B)^{1/4}, (G^3B)^{1/4}, (G^3R)^{1/4}, (B^3G)^{1/4}, (B^3R)^{1/4}, (R^2G^2)^{1/4}, (R^2B^2)^{1/4}, (G^2B^2)^{1/4}, (R^2GB)^{1/4}, (G^2RB)^{1/4}, (B^2RG)^{1/4}\}$.

6. The method of claim 1, where each of the functions f(R,G,B) comprises an associated product of RGB powers that is raised to an inverse-order of the associated product, where an order of a product of RGB powers equals a sum of rational exponents of R, G and B factors of the product of RGB powers.

7. The method of claim 1, where the output RGB values correspond to tristimulus XYZ values.

8. The method of claim 1, where the output RGB values correspond to standard RGB (sRGB) values.

9. The method of claim 1, where the output RGB values correspond to RGB values for a specified illumination color.

10. The method of claim 1, further comprising displaying the adjusted image on a display device.

11. The method of claim 1, further comprising sending the adjusted image to a printer device.

12. A method comprising:
obtaining a training set of images comprising input red, green and blue (RGB) values that depend on sensors used to acquire the images of the training set, and corresponding output RGB values that are independent of the sensors used to acquire the images of the training set;
expanding, by a processor, the input RGB values of the training set of images using a nonlinear base, where terms of the nonlinear base correspond to functions f(R, G,B), where each of the functions f(R,G,B) has an associated value and f(kR,kG,kB) equals k times the associated value, for any scalar k>0, such that each term of the nonlinear base scales linearly with exposure of the images of the training set or brightness of scenes depicted in the images of the training set; and
generating, by the processor, a color-transform from the expanded input RGB values and the corresponding output RGB values.

13. The method of claim 12, further comprising performing said generating the color-transform by regression.

14. The method of claim 13, where the regression is based on trimmed median of squares.

15. The method of claim 12, further comprising storing, on persistent storage, the generated color-transform, such that an image acquisition device can transform expanded input RGB values of an image acquired by the image acquisition device to the output RGB values of the acquired image by using the stored color-transform.

16. The method of claim 12, where the output RGB values correspond to tristimulus XYZ, standard RGB (sRGB), or YCbCr values.

17. The method of claim 12, where each of the functions f(R,G,B) comprises an associated product of RGB powers that is raised to an inverse-order of the associated product, where an order of a product of RGB powers equals a sum of rational exponents of R, G and B factors of the product of RGB powers.

18. The method of claim 12, where the nonlinear base comprises an order-root RGB polynomial.

19. A system comprising:
one or more hardware processors; and
a storage device storing instructions that when executed by the one or more hardware processors cause the system to execute operations comprising:
receiving an image including color values in an input color-space;
expanding the color values of the image in the input color-space using a nonlinear base, where terms of the nonlinear base correspond to functions f(R,G,B), where each of the functions f(R,G,B) has an associated value and f(kR,kG,kB) equals k times the associated value, for any scalar k>0, such that each term of the nonlinear base scales linearly with exposure of the received image or brightness of a scene depicted in the received image;
retrieving, from the storage device, a color-transform corresponding to the nonlinear base;
transforming the expanded color values of the image in the input color-space using the retrieved color-transform to obtain color values of the image in a target color-space; and
outputting a color-corrected instance of the image that includes the color values of the image in the target color-space.

20. The system of claim 19, further comprising a sensor used to acquire the image.

21. The system of claim 20, where the input color-space is a red, green and blue (RGB) space for which the RGB values depend on the sensor used to acquire the image.

22. The system of claim 21, where the target color-space is a tristimulus XYZ space for which the XYZ values are independent of the sensor used to acquire the image and scale linearly with the exposure of the image or the brightness of the scene depicted in the image.

23. The system of claim 21, where the target color-space is a standard red, green and blue (sRGB) space for which the sRGB values are independent of the sensor used to acquire the image and scale linearly with the exposure of the image or the brightness of the scene depicted in the image.

24. The system of claim 21, where the target color-space is corresponds to red, green and blue (RGB) values for a specified illumination color.

25. The of claim 21, where
the operation of receiving the image comprises
retrieving, from the storage device, another color-transform, and transforming the RGB values of the image that is acquired by the sensor to the color values in the input color-space.

26. The system of claim 25, where
the color values of the image in each of the input or output color-space are independent of the sensor used to acquire the image and scale linearly with the exposure of the image or the brightness of the scene depicted in the image,
the input color-space is one of a standard RGB (sRGB) space, a tristimulus XYZ space or a YCbCr space, and
the target color-space is one of the sRGB space, the tristimulus XYZ space or the YCbCr space.

27. The system of claim 26, where the input color-space is different from the target color-space.

28. The system of claim 19, where each of the functions f(R,G,B) comprises an associated product of RGB powers that is raised to an inverse-order of the associated product, where an order of a product of RGB powers equals a sum of rational exponents of R, G and B factors of the product of RGB powers.

29. The system of claim 19, where the nonlinear base comprises an order-root RGB polynomial.

30. The system of claim 29, where the order-root RGB polynomial is a square-root polynomial, and the terms of the square-root polynomial are $\{R, G, B, (RG)^{1/2}, (GB)^{1/2}, (BR)^{1/2}\}$.

31. The system of claim 29, where the order-root RGB polynomial is a cube-root polynomial, and the terms of the cube-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}\}$.

32. The system of claim 29, where the order-root RGB polynomial is a fourth-root polynomial, and the terms of the fourth-root polynomial are $\{R, G, B, (RG)^{1/2}, (GB)^{1/2}, (BR)^{1/2}, (R^2G)^{1/3}, (R^2B)^{1/3}, (G^2B)^{1/3}, (G^2R)^{1/3}, (B^2G)^{1/3}, (B^2R)^{1/3}, (RGB)^{1/3}, (R^3G)^{1/4}, (R^3B)^{1/4}, (G^3B)^{1/4}, (G^3R)^{1/4}, (B^3G)^{1/4}, (B^3R)^{1/4}, (R^2G^2)^{1/4}, (R^2B^2)^{1/4}, (G^2B^2)^{1/4}, (R^2GB)^{1/4}, (G^2RB)^{1/4}, (B^2RG)^{1/4}\}$.

33. The system of claim 19, where the operations further comprise:
obtaining a training set of images comprising color values in the input color-space and corresponding color values in the target color-space;
expanding the color values of the training set of images in the input color-space using the nonlinear base;
generating a color-transform from the expanded color values in the input color-space and the corresponding color values in the target color-space; and
storing the generated color-transform on the storage device.

34. The system of claim 33, wherein the operation of generating the color-transform is performed by regression.

35. The system of claim 34, where the regression is based on trimmed median of squares.

36. The system of claim 19, where the operations further comprise:
retrieving multiple training sets of images, each of the training sets having an associated color-bias and comprising color values in the input color-space and corresponding output color values in the target color-space,
for each training set from among the multiple training sets,
expanding the color values of the training set in the input color-space using the nonlinear base,
generating a color-transform corresponding to a color-bias associated with the training set from the expanded color values of the training set in the input color-space and the corresponding color values of the training set in the target color-space, and
storing the generated color-transform corresponding to the color-bias on the storage device,
prior to performing the operation of retrieving, from the storage device, the color-transform corresponding to the nonlinear base,
obtaining a color-bias of the received image, and
selecting, from among the multiple color-transforms stored on the storage device, a color-transform corresponding to the nonlinear base and the obtained color-bias, and
the retrieved color-transform used to perform the operation of transforming is the selected color-transform.

37. The system of claim 36, where the operation of obtaining the color-bias of the received image comprises determining the color-bias of the received image.

38. The system of claim 36, where the color-bias of the received image is obtained from metadata associated with the received image.

39. The system of claim 19, further comprising a display device, where the color-corrected image is output on the display device.

40. The system of claim 19, where the operation of outputting the color-corrected image comprises sending the color-corrected image to a printer that is communicatively coupled with the system.

\* \* \* \* \*